US007885467B2

(12) United States Patent
Larsen et al.

(10) Patent No.: US 7,885,467 B2
(45) Date of Patent: Feb. 8, 2011

(54) SYSTEMS AND METHODS FOR AUTOMATICALLY DETERMINING OBJECT INFORMATION AND SYSTEMS AND METHODS FOR CONTROL BASED ON AUTOMATICALLY DETERMINED OBJECT INFORMATION

(75) Inventors: Paul A. Larsen, Madison, WI (US); James B. Rawlings, Madison, WI (US); Nicola J. Ferrier, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1389 days.

(21) Appl. No.: 11/237,088

(22) Filed: Sep. 28, 2005

(65) Prior Publication Data

US 2007/0071328 A1    Mar. 29, 2007

(51) Int. Cl.
G06K 9/00 (2006.01)
G06K 9/46 (2006.01)
G06K 9/62 (2006.01)
(52) U.S. Cl. .................. 382/225; 382/203; 382/154
(58) Field of Classification Search ................ 382/171, 382/173, 177–179, 180–190, 197, 201, 199, 382/203, 204, 245; 348/206, 207.99, 207.1, 348/207.11
See application file for complete search history.

(56) References Cited

U.S. PATENT DOCUMENTS

| | | | | |
|---|---|---|---|---|
| 4,731,860 A | * | 3/1988 | Wahl | 382/281 |
| 5,629,989 A | * | 5/1997 | Osada | 382/281 |
| 5,631,982 A | * | 5/1997 | Inselberg et al. | 382/281 |
| 6,324,299 B1 | * | 11/2001 | Sarachik et al. | 382/151 |
| 6,490,369 B1 | * | 12/2002 | Beiman | 382/153 |
| 6,771,818 B1 | * | 8/2004 | Krumm et al. | 382/225 |
| 7,359,555 B2 | * | 4/2008 | Porikli et al. | 382/204 |

OTHER PUBLICATIONS

Daniel Crevier, A Probabilistic Method for Extracting Chains of Collinear Segments, Computer Vision and Image Understandingvol. 76, Issue 1, , Oct. 1999, pp. 36-53.*
A. Etemadi, J.-P. Schmidt, G. Matas, J. Illingworth, and J. Kittler, "Low-Level Grouping of Straight Line Segments," Proc. British Machine Vision Conf., pp. 119-126.New York: Springer-Verlag, 1991.*

(Continued)

*Primary Examiner*—Vu Le
*Assistant Examiner*—Andrae S Allison
(74) *Attorney, Agent, or Firm*—Crawford Maunu PLLC

(57) ABSTRACT

An image of high-aspect-ratio objects is analyzed to locate linear features within the image. The gradient direction for each pixel is determined, and connected pixels having similar gradient directions are grouped into line support regions. A linear feature is determined for each line support region. The linear features are analyzed to identify those that are colinear. The linear features are then analyzed to find groups that are parallel and that sufficiently overlap. Additional sets of linear features that intersect the identified group are combined into that group. The line support regions of the grouped linear features are analyzed to determine representative orientation and/or dimensional information, which is analyzed to determine statistical information about a plurality of the objects. This information is used to monitor or control one or more processes associated with the objects, to reject the objects or a structure or device comprising the objects, or the like.

30 Claims, 24 Drawing Sheets

OTHER PUBLICATIONS

An Automatic Segmentation Algorithm for Noisy, In-situ Crystallization Images; Paul A. Larsen and James B. Rawlings; Dec. 14, 2004, Power Point Presentation.

T. Allen, Particle Size Measurement, vol. 1, $5^{th}$ Edition, Chapman and Hall, London 1997; table of contents only.

T. Allen, Powder Sampling and Particle Size Determination, Elsevier, 2003; table of contents only.

J. Calderon De Anda et al, Multi-scale Segmentation Image Analysis for the In-Process Monitoring of Particle Shape with Batch Crystallizers, Chem. Eng. Sci., 60: 1053-1065, 2005.

E. Kaufman et al, In Situ Visualization of Coal Particle Distribution in a Liquid Fluidized Bed Using Florescent Microscopy, Powder Tech., 78: 239-246, 1994.

J. B. Burns et al, Extracting Straight Lines, IEEE Trans. Pattern Anal. Machine Intell., 8(4); 425-455, Jul. 1986.

D.G. Lowe, 3-Dimensional Object Recognition from Single Two-Dimensional Images, Artificial Intell., 31(3): 355-395, 1987.

* cited by examiner

SYSTEMS AND METHODS FOR AUTOMATICALLY DETERMINING OBJECT INFORMATION AND SYSTEMS AND METHODS FOR CONTROL BASED ON AUTOMATICALLY DETERMINED OBJECT INFORMATION

BACKGROUND OF THE INVENTION

1. Field of the Invention

This invention is directed to systems and methods for determining information about objects, such as their shape, size, orientation and the like, and for systems and methods for controlling one or more processes or devices based on the determined object information.

2. Related Art

Suspension crystallization processes often result in crystals having a high aspect ratio. Such high-aspect-ratio crystals are commonly described as needle-like, rod-like or acicular. Such high-aspect-ratio crystals are particularly commonplace in the types of complex, high-value-added chemical compounds typically produced by the specialty chemical and pharmaceutical industries. When crystallizing such high-aspect-ratio, crystal-forming chemical compounds, controlling the particle size distribution (PSD) is typically highly important. For example, when the particle size distribution of such high-aspect-ratio crystals is within a desired range, the efficiency of the downstream manufacturing process may be optimized or maximized. Likewise, when the particle size distribution of such high-aspect-ratio crystals is within a desired range, the overall quality of the end product being made, whether such high-aspect-ratio crystals are an intermediate product or the final end product, may be optimized or maximized.

Conventional techniques for determining the particle size distribution of a group of crystals include laser diffraction and laser backscattering, which are commonly-used on-line techniques. It should be appreciated that the drawbacks associated with these techniques discussed below are characteristic of the drawbacks associated with other techniques. T. Allen, "Particle Size Measurement, Vol. 1, $5^{th}$ Edition", Chapman and Hall, London, 1997, discusses the conventional techniques in detail.

Laser diffraction operates by passing laser light through a quantity of the suspended crystal particles. The diffracted laser beams are diffracted onto a CCD array or the like, where the diffraction patterns are captured. Based on the captured diffraction patterns, the crystal size and particle size distribution can be determined. However, the analysis algorithms developed for analyzing the diffracted patterns have all been developed based on the assumption that the particles are spherical. Spherical particles make the analysis easy, because the diffraction patterns are independent of the orientation of the crystal particles and thus are solely dependent on the size of crystal particles. Such orientation independence is obviously an appropriate assumption only for spherical particles, or near spherical particles, such as tetrahedrons, cubes and other near spherical particles.

Because the measured size of high-aspect-ratio crystals is highly dependent on the orientation of the particles, such laser diffraction methods are inappropriate for high-aspect-ratio crystals. Additionally, because the diffraction patterns are formed by passing light through a sample, such diffraction patterns are typically inappropriate for in situ measurements or measurements of crystal solutions having high solids concentrations, where an insufficient amount of light would actually pass through the sample and be recorded. Thus, laser diffraction over-estimates the broadness of the spherical diameter distribution for high-aspect-ratio crystals due to such orientation effects and the spherical models used to interpret the diffraction data.

In contrast to laser diffraction, which relies on light passing through the sample, laser backscattering relies on the particles reflecting a sufficient amount of light back towards the light source. Laser backscattering provides a cord length distribution that can be related theoretically to the particle size distribution. In laser backscattering, the laser beam is rotated over the particle slurry such that each particle backscatters light as the light passes over that particle. Based on a time-to-cross measurement and the known speed of movement of the laser beam, the cord length of the laser beam's path over the crystal can be determined. The cord length distribution can only be related back to the actual size distribution of the crystals by assuming some geometry for the particles, such as aspect ratio, orientation and/or the like. Because the aspect ratio, i.e., a length to thickness, of the crystals is one of the variables that appropriate control of the crystallization process affects, assumptions about the crystals' geometry render the analysis less than complete.

As a result of the shortcomings of laser diffraction and laser backscattering, various imaging-based systems have been developed to size high-aspect-ratio, i.e., elongated, crystals. Such imaging systems and techniques offer the potential to extract both size and shape information. Thus, such imaging based systems and techniques are a promising and attractive approach for obtaining particle size distributions for non-spherical particles. Conventional, imaging-based, on-line particle size and shape analyzers are available from Malvern and Beckman-Coulter, such as the Malvern Sysmex FPIA3000 and the Beckman-Coulter RapidVUE. *Powder Sampling and Particle Size Determination*, by T. Allen, Elsevier, 2003, surveys other imaging-based instruments.

Typically, these instruments require withdrawing a sample of the crystal slurry from the crystallization reaction vessel. Drawing such samples is inconvenient, possibly hazardous, and raises concerns about whether the sample is truly representative of the bulk slurry. One notable system that provides for in situ sampling is the Particle Vision and Measurement (PVM) system from Lasentec, Inc. The Lasentec Particle Vision and Measurement in situ probe is combined with automatic image analysis software that is useful for some types of crystals. However, this system does not give suitable results for high-aspect-ratio crystal particles.

SUMMARY OF THE DISCLOSED EMBODIMENTS

Conventionally, in situ video microscopy has thus far been limited to quality monitoring. This has primarily been due to the nature of the in situ images, which contain blurred, out of focus and overlapping crystal particles. Thus, the nature of the in situ images and the available analytical tools have thus far precluded successfully applying image analysis to automatically quantify particle size and/or shape. More broadly, automatically analyzing images, such as for machine vision, intelligence gathering, and the like, has required well controlled environmental parameters, such as lighting, focus, depth of field, contrast, brightness and/or the like. For example, conventional machine vision systems and methods typically require that the illumination level be known or measured, that the direction and angle of the illumination source(s) relative to the object being imaged be known, that the distance from the surface being imaged be known or controlled, and the like. In general, most conventional automatic image analysis systems and methods require very well behaved images with little noise and that the general location of the portion of the object to be imaged be known, in combination with the well-controlled lighting parameters discussed above.

In contrast, at least some embodiments of systems and methods according to this invention are able to acquire and analyze information from images of objects having relatively long, relatively closely-spaced linear features having a defined spatial relationship, where the images are at best of very low quality. Such images will typically have poor contrast and/or brightness, poor focus, objects incompletely in the field of view and/or overlapping, objects at poorly defined, or even at random and/or arbitrary, locations, varying lighting conditions and/or the like.

The inventors have determined that appropriately segmenting such images, especially poor quality images, is desirable to successfully automatically analyze such images, such as, for example, in situ images of a crystallization process used to attempt to determine a particle size distribution of particles appearing in the image.

In this context, segmentation refers to separating objects of interest in the image, such as, for example, high-aspect-ratio crystals, from the background, such as, for example, the slurry of the crystals being formed during a crystallization reaction. Of course, segmentation is always easier if the objects are imaged using transmitted light, because the outlines of the particle are easily distinguished. However, in in situ imaging, reflected light often must be used due to the high solids concentrations that typically occur during crystallization. Accordingly, segmenting such images is substantially more difficult.

For example, "Multi-scale Segmentation Image Analysis for the In-Process Monitoring of Particle Shape with Batch Crystallizers", J. Calderon De And a et al, Chem. Eng. Sci., 60: 1053-1065, 2005, discloses a technique for automatically segmenting in-process suspension crystallizer images. This technique was only demonstrated on images that appeared to have been acquired at low solids concentrations where there are no overlapping particles and the particles edges are fairly well defined. Similarly, "In Situ Visualization of Coal Particle Distribution in a Liquid Fluidized Bed Using Florescent Microscopy", E. Kaufman et al, Powder Tech., 78: 239-246, 1994, discloses an in situ florescence imaging method, where the liquid phase of a fluidized bed was made to fluoresce while leaving the coal particles opaque. This enabled a graylevel threshold method to be used to detect the particle edges. However, for more dense particle volume fractions, the inventors had to manually determine which of these segmented particles could be used for sizing.

This invention provides systems and methods for analyzing even low quality images of objects having edge features having known spatial relationships.

This invention separately provides systems and methods for analyzing images of objects having relatively long, relatively closely-spaced edge features.

This invention separately provides systems and methods for analyzing images of objects having edge features having defined angular relationships.

This invention separately provides systems and methods for segmenting objects having edge features having known spatial relationships from other portions of the image.

This invention separately provides systems and methods for segmenting objects having relatively long, relatively closely-spaced edge features from other image portions.

This invention separately provides systems and methods for segmenting objects having edge features having defined angular relationships from other image portions.

This invention separately provides systems and methods for segmenting objects, appearing in low quality images, that are generally insensitive to lighting conditions.

This invention separately provides systems and methods for reliably locating objects in an image generally independently of brightness and/or contrast levels in the image.

This invention separately provides systems and methods for analyzing in situ images of high-aspect-ratio objects.

This invention separately provides systems and methods for segmenting an in situ image of high-aspect-ratio objects.

This invention separately provides systems and methods for identifying areas, within an in situ image of high-aspect-ratio objects, that represent the objects.

In various exemplary embodiments of systems and methods according to this invention, an image of high-aspect-ratio objects, such as an in situ image of needle-like crystals, are first analyzed to locate linear features within the image. In various exemplary embodiments, Burns direction analysis is used to locate these linear features. Connected pixels having the same general gradient direction are grouped into line support regions and a linear feature is determined for each line support region.

In various exemplary embodiments, the linear features are analyzed to identify two or more linear features that are effectively co-linear. One or more virtual lines that represent the combination of these two or more co-linear lines are determined based on the two or more co-linear lines. The linear features and virtual lines are then analyzed to find groups of two or more linear features and/or virtual lines that have the defined angular relationship, such as being parallel, and that, based on the nature of the object, overlap an appropriate amount and/or are spaced an appropriate distance apart. In various exemplary embodiments, any additional sets of two or more linear features and/or virtual lines that have members in common with the identified group are combined into that group. In various exemplary embodiments, the line support regions associated with the linear features of the group are combined and analyzed to determine representative orientation and/or dimensional information.

In various other exemplary embodiments, each pair of linear features is analyzed to determine if that pair of linear features is co-linear or overlapping. Clusters of the located linear features are then clustered based on the determined classifications. A representative shape is generated for each cluster. One or more parameters such as orientation, shape, size and/or the like, are then determined for each representative shape.

In various exemplary embodiments, the orientation and/or dimensional information for a plurality of objects is analyzed to determine statistical information about the plurality of objects. In various exemplary embodiments, the orientation, dimensional and/or statistical information is used to monitor one or more processes associated with the objects, to control one or more processes associated with the objects, to reject the objects or a structure or device comprising the objects, or the like.

One or more statistical measures can then be determined for the determined parameters' dimensional information, orientation and/or the like for the representative shapes, such as distribution, mean, median and/or the like of, size, length, width, area, orientation or the like. Based on these statistical measures, one or more process control variables can be modified. Alternatively, a determination can be made whether the process has reached a sufficient completion stage such that the objects can be passed on to a downstream process, if the objects are appropriate for further processing or sale, or the like.

In various exemplary embodiments, an image analysis system according to this invention includes an image segmentation circuit, routine or application, a linear feature clustering circuit, routine or application, a parameter determining circuit, routine or application, a statistical value determining circuit, routine or application, and a control signal determining circuit, routine or application. In various exemplary embodiments, these control signals are output to a process control device, a material handling system, an attention indicating system, or the like.

These and other features and advantages or various exemplary embodiments of systems and methods according to this invention will be described in greater detail below with respect to the exemplary embodiments shown in the attached figures.

BRIEF DESCRIPTION OF DRAWINGS

Various exemplary embodiments of the systems and methods according to this invention will be described in detail, with reference to the following figures, wherein.

DETAILED DESCRIPTION OF DISCLOSED EMBODIMENTS

Figure 1:
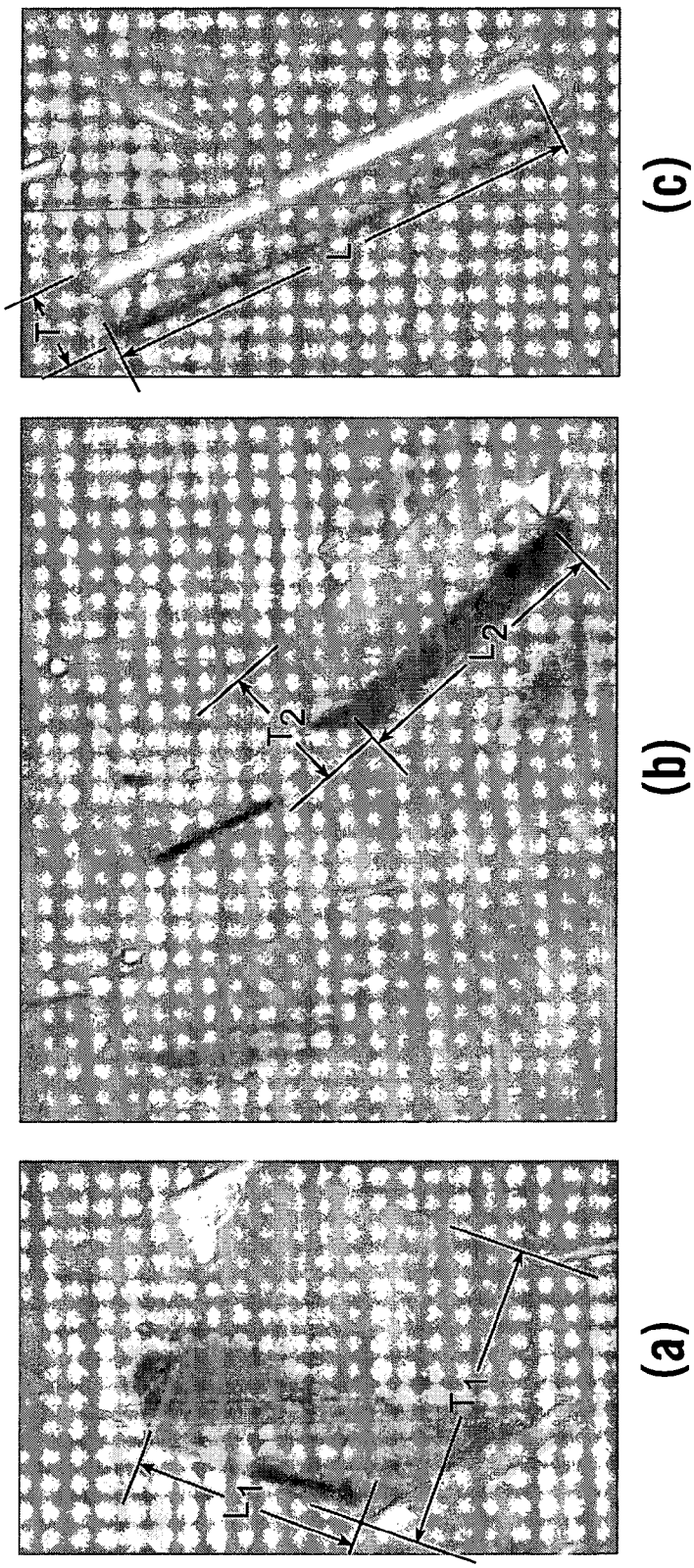
FIG. 1 illustrates various types of crystals.

The various systems and methods according to this invention are applicable to locating high-aspect-ratio objects in any image. Various exemplary embodiments of systems and methods according to this invention are also useable to locate objects having known dimensions and/or dimensional relationships in very noisy and/or low quality images. In general, "low quality" images are those images where the foreground objects are difficult to distinguish from the background of the image and/or various foreground images are difficult to distinguish from each other. Such "low quality" images typically have inappropriate contrast and/or brightness levels, are out of focus, and/or are full of non-image artifacts, such as moiré patterns, noise, various image distortions and the like. In general, in various exemplary embodiments of systems and methods according to this invention, objects within the image can be identified and segmented without regard to the contrast and/or brightness levels of the image. Thus, various exemplary embodiments of systems and methods according to this invention can locate objects from images that have less than ideal contrast, brightness, focus and/or other lighting parameter values and/or that were acquired with less than optimal focus and/or lighting parameter values for the particular objects of interest and/or for the background or foreground objects appearing within the image.

For ease of understanding and explanation, the following detailed description of specific exemplary embodiments of systems and methods according to this invention will be described with respect to locating and segmenting high-aspect-ratio crystal particles appearing within an image obtained by in situ sampling of the crystallization process occurring within a reaction vessel. Likewise, for ease of understanding and explanation, the shape information obtained from such located and segmented crystals within the image and the statistical information obtained from a plurality of such crystals segmented from the image are used to control and/or monitor various aspects of the crystallization process.

However, it should be appreciated that the systems and methods according to his invention are not limited to in situ images of high-aspect-ratio crystal particles nor to controlling and/or monitoring such crystallization processes. Rather, it should be appreciated that systems and methods according to this invention can be applied to locate and segment other high-aspect-ratio objects from an image containing such objects and/or can be used to analyze one or more of those objects for individual shape information or the like and/or for statistical information about the group of objects. This individual and/or statistical information can be used in various exemplary embodiments of systems and methods according to this invention to inform various actions that can be taken with respect to the objects, such as monitoring, process control, material handling, inspection and the like.

Likewise, it should be appreciated, that in various exemplary embodiments of systems and methods according to this invention, objects of any known dimension or limited range of dimensions and/or any known shape or limited range of shapes can be identified and segmented from an acquired image, even if that image is of rather low quality at best and/or is relatively noisy at best. It should further be appreciated that any other image of one or more objects, beyond in situ images, where the brightness, the contrast, the lighting conditions, the focus, and/or any other parameter that affects the quality of the image, can vary in unknown and/or uncontrolled ways, can also be analyzed using systems and methods according to this invention.

Thus, while the following detailed description focuses primarily on high-aspect-ratio crystal particles having parallel sides, it should be appreciated that the subject matter of this invention is not limited to such exemplary embodiments. Therefore, various exemplary embodiments of systems and methods according to this invention can be directed to objects having known shapes, dimensions, spatial relationships and/or dimensional relationships, and objects that do not necessarily have high aspect ratios.

FIG. 1 shows three different crystals having different aspect ratios. In particular, FIG. 1(a) shows a very low aspect ratio crystal. In particular, this crystal has a central body that is wider than it is tall, in that it has a thickness $T_1$ that is greater than its body length $L_1$. In fact, the overall shape of the crystals shown in FIG. 1 can best be described as near or effectively circular. Thus, the laser diffraction method for determining the particle size distribution of a crystal slurry comprising crystals such as that shown in FIG. 1(a) would be appropriate and useful. However, as shown in FIG. 1(a), an image of such low aspect ratio objects can still be quite noisy and of sufficiently poor quality such that it is difficult to discern the object.

FIG. 1(b) shows an intermediate aspect ratio crystal whose body length $L_2$ is approximately 1½ times its thickness $T_2$. Because the cord length over the range of possible orientations of the crystals shown in FIG. 1(b) is within a fairly narrow range, when laser backscattering is used to measure a crystal slurry comprising the crystals shown in FIG. 1(b), a reasonable particle sized distribution can be developed. However, as shown in FIG. 1(b), an image of such intermediate aspect ratio objects can still be quite noisy and of sufficiently poor quality such that it is difficult to discern the object.

FIG. 1(c) shows a high aspect ratio, or rod-like, needle-like or acicular crystal. In particular, the crystal shown in FIG. 1(c) has a length L that is approximately six times its thickness T. Accordingly, laser diffraction is inappropriate for these high aspect ratio crystals, for the reasons outlined above. Additionally, laser backscattering is inappropriate, because the cord length is highly sensitive to the angle at which the laser beam crosses the crystal. Moreover, the image quality makes it difficult to locate the object in the image. Due to such difficulties, even hand analysis of such images is time consuming and very subjective.

Accordingly, the inventors have developed novel image-based systems and methods that are usable to extract or segment such high-aspect-ratio objects from the surrounding background and/or foreground portions of the image and/or that are usable to analyze low-quality images to extract or segment objects from the surrounding background and/or foreground portions of the image. Once the objects are segmented from the image, shape, size, orientation and/or other relevant information can be determined for individual objects, and statistical information about the objects, such as numbers, orientations, shapes, dimensions and/or other relevant parameters about the objects can be developed. For example, for high-aspect-ratio objects, such as high-aspect-ratio crystals, such images can be analyzed to determine lengths and other shape and dimension information, which can be used to develop particle size distributions and the like.

Figure 2:
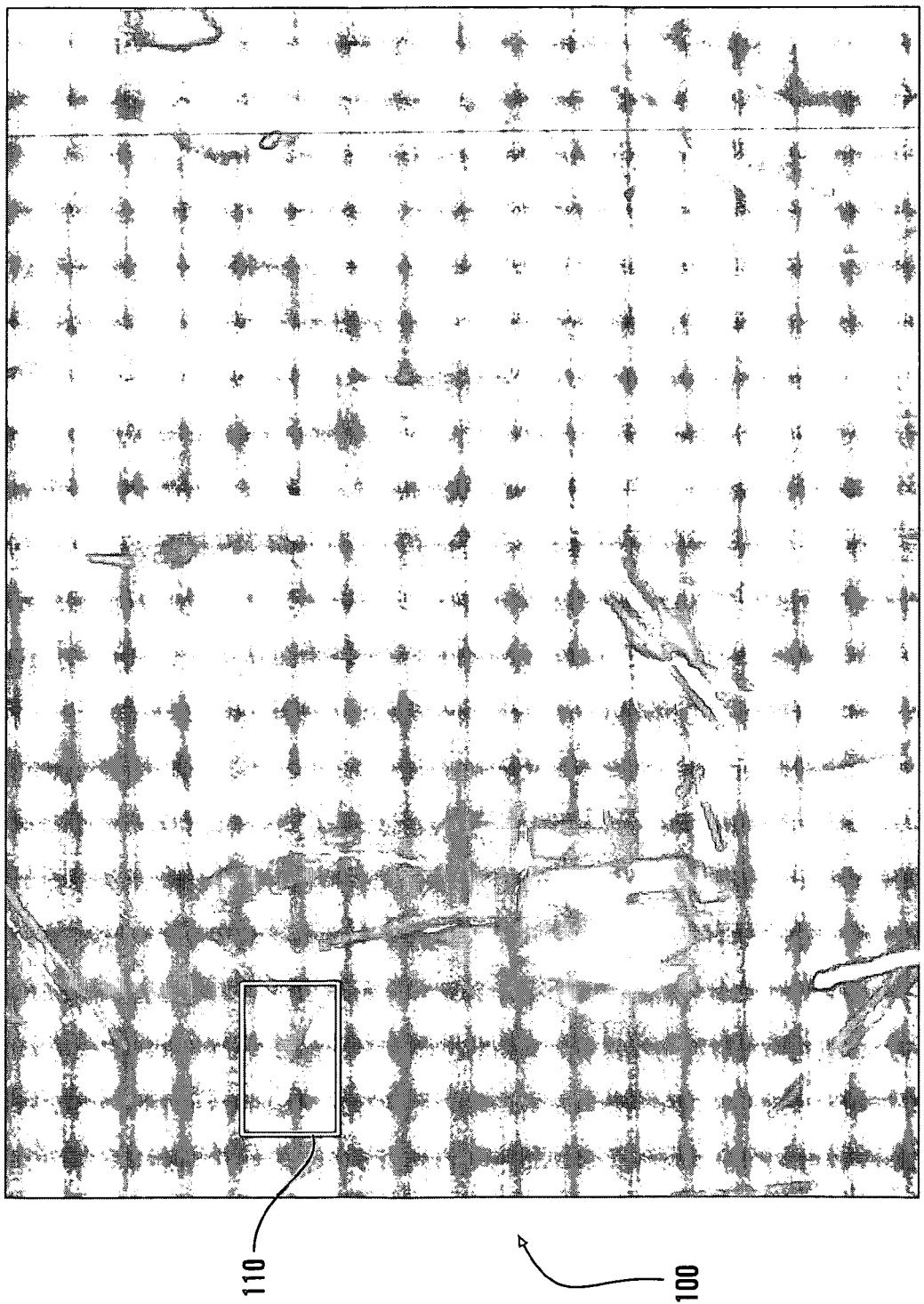
FIG. 2 illustrates a representative image to be analyzed.
Figure 3:
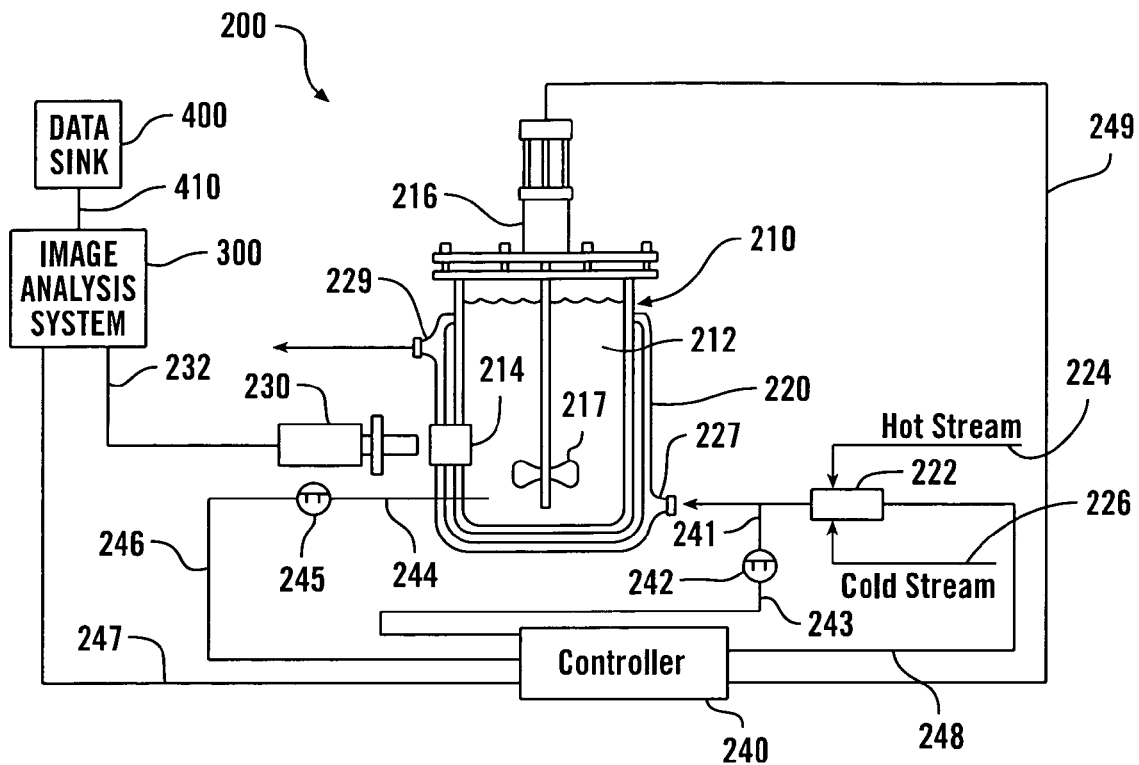
FIG. 3 illustrates one exemplary embodiment of a process control system that incorporates one or more exemplary embodiments of systems and methods according to this invention.

FIG. 2 shows one exemplary embodiment of an image 100 that is typically obtained using the system 200 shown in FIG. 3. In particular, the image shown in FIG. 2 is an in situ image of a plurality of crystals that are growing within a reaction vessel at the time the image 100 was captured. In particular, the in situ image 100 includes a portion 110 that includes a sample crystal. In particular, the image shown in FIG. 2 is of very low quality, in that the objects in this image are generally out of focus. Additionally the contrast and brightness are generally inappropriate, making it difficult to distinguish individual crystals in the foreground of the image from each other and from the background of the image. Because the image is out of focus, the contrast is too low, and the brightness is too high, the edges of the crystals are diffuse and difficult to identify, even by hand.

FIG. 3, as outlined above, illustrates one exemplary embodiment of a system 200 that is useable to perform a suspension crystallization process, as well as to capture an in situ image of that process and to analyze that image to ultimately obtain information on the crystallization process, including particle size distribution and the like. As shown in FIG. 3, the system 200 includes a reaction vessel 210 having a reaction space or interior 212. The reaction vessel 210 is surrounded by a temperature control jacket 220. In a crystallization process, a solution from which at least one component is to be crystallized is placed into the reaction space 212. A digital camera or other digital image capture device 230 is arranged adjacent to an optical flat 214 of the reaction vessel 210 so that it can capture an image of the interior 212 of the reaction vessel 210. The image capture device 230 outputs a captured digital image as an array of pixels over a signal line 232 to an image analysis system 300. The image analysis system 300, which will be described in greater detail below, analyzes the digital image provided by the image capture device 230 and generates one or more process and/or device control signals and/or one or more sets of statistical information about the crystallization process occurring within the reaction vessel 210. This information can either be output over a signal line 247 to the controller 240 and/or can be output over a signal line 410 to a data sink 400.

As indicated above, the reaction vessel 210 includes a reaction space 212 in which a solution containing a chemical to be precipitated out as crystals is placed. The optical flat or optical device or other viewing structure 214 provides a generally transparent and generally distortion-free view into the reaction space 212 of the reaction vessel 210 and is formed in the side of the reaction vessel 210. For large, production-size reaction vessels 210, the reaction vessel will have a transparent window adjacent to the optical flat to allow a view into the interior 212. Of course, the window and the optical flat can be combined into a single structure. However, if the reaction vessel is clear, as is common with small, research-oriented reaction vessels, no window into the interior 212 of the reaction vessel 210 is needed. An impeller 217, driven by an external motor 216, is positioned in the reaction space 212 of the reaction vessel 210. The impeller 217 is useable to stir the solution placed inside the interior 212 of the reaction vessel 210.

The temperature control jacket 220 typically extends around the entire exterior of the reaction vessel 210, possibly except in the location of the optical flat or other optical device 214. The temperature control jacket 220 typically has a hollow interior having an inlet 227 and an outlet 229. A temperature control fluid, such as water or the like, can be introduced through the inlet 227 to raise, maintain, or cool the temperature of the solution placed in the reaction space 212 of the reaction vessel 210. As shown in FIG. 3, a mixing valve 222 is connected to the inlet 227. A cold fluid supply line 224 and a warm fluid supply line 226 are each connected to the mixing valve 222 and supply, respectively, cold and warm temperature control fluid to the mixing valve 222. Depending on the position of the mixing valve 222, various proportions of the hot and cold temperature control fluids are mixed together to provide a desired flow, at a desired temperature, of the temperature control fluid from the mixing valve 222 through the inlet 227 into the interior of the temperature control jacket 220 and out through the outlet 229.

The controller 240 is also connected to a pair of temperature sensors 242 and 245 over a pair of signal lines 243 and 246, respectively. The temperature sensors 242 and 245 are connected to temperature probes 241 and 244, respectively. The controller 240 inputs the sensed temperature information from the temperature sensors 242 and 245, along with the process control signals and/or the statistical information from the image analysis system 300 over the signal line 247, and outputs various process and/or device control signals, including control signals over the signal lines 248 and 249 to the mixing valve 222 and/or to the impeller motor 216. Based on the control signals output on the signal lines 248 and 249 from the controller 240, the controller 240 can, among other actions, turn on the impeller motor 216 and/or can adjust the temperature of the temperature control fluid flowing through the jacket 220.

In operation, after a solution to be crystallized is introduced in to the reaction space 212 of the reaction vessel 210, the solution is typically slowly cooled by controlling the temperature of the temperature control fluid flowing through the inlet 227 into the interior of the temperature control jacket 220. As the temperature of the solution is reduced gradually, at least one of the chemicals or components in the solution begins crystallizing. As the crystallization process continues, various images of the state of the crystallization process are captured using the image capture device 230. The images are transmitted from the image capture device 230 over the signal line 232 to the image analysis system 300, which analyzes the images and generates various process information signals, which are output over the signal line 247 to the controller 240. As the crystallization process continues, temperature signals over the signal lines 243 and 246 and the process information signals over the signal line 247 are combined by the controller 240 to generate control signals, for example, to adjust the temperature of the fluid flowing from the mixing valve 220 into the inlet 227 or to turn on the impeller 216. In many crystallization processes, the controller 240 at least in part operates the mixing valve 222 and/or the impeller 216 to maintain the aspect ratio of the crystals within the desired range.

As outlined above, the image capture device 230 captures in situ images of the state of the crystallization process. These images are digital images comprising a 2-dimensional array of pixels, where each pixel has a grayscale or intensity value, which is typically a value between 0 and 255 ($2^8$ values). This image data is output to the image analysis system 300, over the signal line 232. The image analysis system 300 analyzes the digital image to locate probable crystals within the image, to extract shape information about those crystals from the image, and possibly to generate statistical values based on the various shape parameters.

It should be appreciated that, in various exemplary embodiments, the image analysis system 300 can generate other types of signals that can be used in addition to, or in place of, the process information signals output on the signal line 247 to the controller 240. For example, the image analysis system 300 can be designed to output, after analyzing the captured in situ images, extracting the shape information from the images and generating and analyzing statistical values signals that trigger alarms to personnel monitoring the crystallization process. Such alarms can indicate that more interactive control of the process by the monitoring personnel is required, that the crystallization process can no longer be automatically monitored and controlled, or that the crystallization process has failed in some manner. Such signals can also be used to indicate that the crystallization process has completed. Such signal can either alert the monitoring personnel, who transfer the contents of the reaction space 210 to a downstream process and replenish the contents of the reaction space 212 with additional solution to be crystallized. These signals can also be output to the controller 240 or another controller, either of which can automatically cause the content of the reaction space 212 to be transferred to a downstream process and the reaction space 212 prepared to receive, and/or provided with, another charge of solution to be crystallized.

The image analysis system 300 can also output the parameter information and/or the statistical information to a data sink 400 over a signal line 410. This data sink 400 can be a memory or other device usable to indefinitely store that information, some other device designed to analyze that information and generate one or more control signals or the like, similarly to the controller 240. In general, the data sink 400 can be any known or later device that is able to use information that can be output by the image analysis system 300.

It should be appreciated that the image analysis system 300 can be implemented using any known or later developed device or system of devices, including an application-specific integrated circuit (ASIC) or other integrated circuit structure, a hardwired electronic or logic circuit such as a discrete element circuit, a programmable logic device such as a PLD, PLA, FPGA or PAL, a suitably-programmed digital signal processor (DSP), a suitably-programmed micro-controller, a suitably-programmed microprocessor, a suitably-programmed special-purpose or general-purpose computer or the like, possibly along with one or more related peripheral integrated circuit elements.

When implemented using hardware elements, various exemplary embodiments of the image analysis system 300 will typically include circuit or other hardware structures corresponding to one or more of an image segmenting circuit, a linear feature analyzing circuit, a linear feature clustering circuit, a parameter determining circuit, a statistical measure determining circuit, and/or a control and/or information signal output circuit. When implemented using firmware and/or software elements, various exemplary embodiments of the image analysis system 300 will typically include one or more sets of one or more instructions, including one or more of: instructions for segmenting the acquired image, instructions for analyzing linear features, instructions for clustering linear features, instructions for determining parameters for the segmented or clustered areas of the image, and/or instructions for generating and/or outputting control and/or information signals.

It should be appreciated that these instructions can be organized in any known or later developed form, such as, for example, routines and/or subroutines, objects, applications, procedures, managers and/or the like. The instructions can be compiled, and thus suitable for direct execution by a processor, or can be interpreted by an intermediate program executing on a processor.

It should be appreciated that a routine, application, manager, procedure, object or the like can be a self-consistent sequence of computerized steps that lead to a desired result. These steps can be defined by and/or in one or more computer instructions stored in a computer readable medium, which encompasses using a carrier wave or the like to provide the software instructions to a processor. These steps can be performed by a processor executing the instructions that define the steps. Thus, the terms "routine", "application", "manager", "procedure", and "object" can refer to, for example, a sequence of instructions, a sequence of instructions organized within a programmed-procedure or programmed-function, and/or a sequence of instructions organized within programmed processes executing in one or more computers. Such routines, applications, managers, procedures, objects or the like can also be implemented directly in circuitry that performs the procedure.

In general, any device, system or structure, which is capable of implementing a finite state machine that is in turn capable of implementing various ones of the flowcharts shown in FIGS. 4, 5, 7-12 and/or 27 and 28 and described below, can be used to implement the image analysis system 300. It should be appreciated that methods according to this invention can be performed by a computer executing one or more appropriate programs, by special purpose hardware designed to perform such methods, or any combination of such hardware, firmware and software elements.

It should further be appreciated that the image analysis system 300 can be combined with either or both of the camera 230 and/or the controller 240. For example, the image analysis system 300 and the controller 240 could both be implemented using a single programmed processor and related peripheral integrated circuit elements, such as in a desktop or laptop computer, a server, a network of computers, the Lasentec Particle Vision and Measurement (PVM) system or similar systems, the Malvem Sysmex FPLA3000 system or similar systems and the Beckman-Coulter RapidVUE system or similar systems and the like, which could also incorporate the camera hardware.

It should also be appreciated that, in various other exemplary embodiments of systems and methods according to this invention, material and processes other than crystals in a crystallization process can be the subjects of systems and methods according to this invention. For example, many products obtain strength and other desirable material properties based on the constituent material being essentially randomly distributed, such that the orientations of the material object are distributed equally in all directions. For example, "felts" of various materials, such as paper, fabrics, engineered wood products and the like, obtain strength and other desirable material properties in this manner. Typically, the constituent objects of these products have high aspect ratios and/or have known dimensions or dimensional relationships. Accordingly, systems and methods according to this invention can analyze images of these products to locate and segment such constituent objects, extract shape information about those objects and generate statistical information about those objects, such as the distribution of orientations of the objects. Based on the statistical information, the images can be used to inspect the products and determine if the products pass inspection or must be rejected. Such information can also be used to provide process control feedback signals and/or to monitor the production processes, as outlined above with respect to the crystals and the reaction of the vessel 210.

In general, regardless of the source of the image data, systems and methods according to this invention can be used to segment such high-aspect-ratio objects and/or objects having known dimensional and/or spatial relationships.

Figure 4:
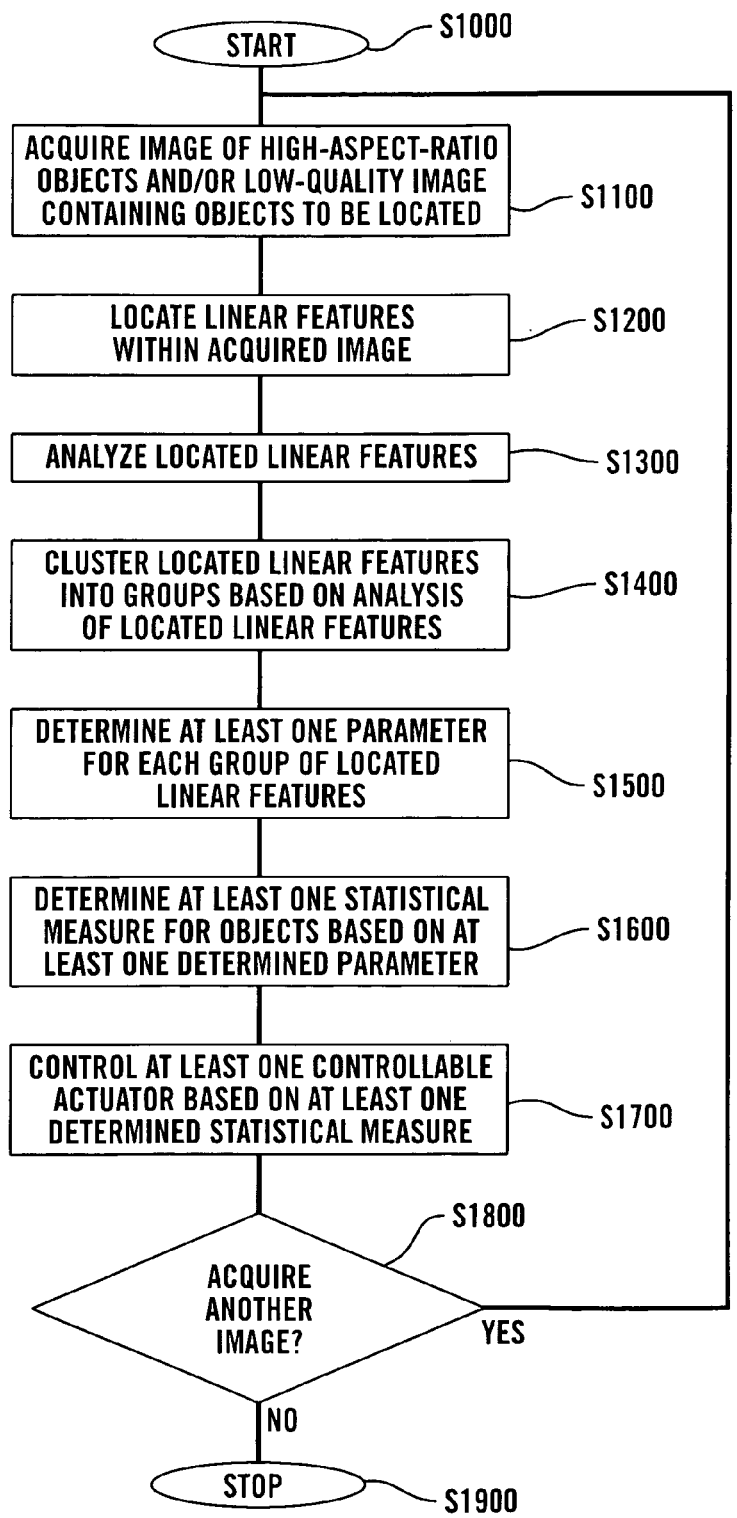
FIG. 4 is a flowchart outlining one exemplary embodiment of a method for identifying objects in an image and of a method for controlling process parameters based on the identified objects according to this invention.

FIG. 4 is a flowchart outlining one exemplary embodiment of a method for analyzing images of high-aspect-ratio objects and/or for analyzing low-quality images of objects having known spatial and/or dimensional relationships, and for using information extracted from such images. For ease of understanding and explanation, the following detailed descriptions of the various flowcharts outlining exemplary embodiments of methods according to this invention are directed to analyzing images containing high-aspect-ratio crystals. However, it should be appreciated that the images being analyzed are not limited to images of such high-aspect-ratio crystals, as outlined above.

As shown in FIG. 4, beginning in step S1000, operation of the method continues to step S1100, where an image, such as an in situ crystallization image of a crystallization process occurring within a reactor vessel or a low quality of a plurality of general objects, is acquired. Then, in step S1200, a plurality of linear features are located within the acquired image. Next, in step S1300, the located linear features are analyzed. Operation then continues to step S1400.

In step S1400, sets of located linear features are clustered into groups based on the analyses of the located linear features generated in step S1300. Next, in step S1500, at least one parameter is determined for each set of clustered located linear features. It should be appreciated that, in various exemplary embodiments, these parameters can be, but are not limited to, the length and/or orientation of a representative line generated for the clustered linear features, a representative area of image portions associated with clustered linear features, length of a major axis, length of a minor axis, and/or major/minor axis ratio of an ellipse that encompasses the clustered linear features, or the like. Then, in step S1600, at least one statistical measure for the crystals within the reactor vessel can be determined based on the at least one determined parameter for the sets of clustered linear features. Operation then continues to step S1700.

In step S1700, at least one controllable actuator, process variable, alarm and/or the like is controlled based on at least one of the at least one determined statistical measure and/or at least one of the at least one determined parameter. For example, in the system 200 shown in FIG. 2, at least one process variable for the crystallization process occurring within the reactor vessel can be modified based on at least one of the at least one determined statistical measure and/or at least one of the at least one determined parameter. It should be appreciated that, in the process shown in FIG. 3, the process variable can be cooling temperature, cooling rate, stirring rate or the like. The process variable can also be an indication of whether the crystallization process has completed or not. It should be appreciated that any useful process variable that affects and/or controls the crystallization process can be modified according to this invention. Then, in step S1800, a determination is made whether another image is to be acquired. If so, operation returns to step S1100. Otherwise, operation continues to step S1900, where operation of the method ends.

It should be appreciated that, in various other exemplary embodiments, the controllable actuator can be a valve, a material handling system, a motor, a pump, a compressor or the like. For example, in the system 200 shown in FIG. 2, the controllable actuator can include the mixing valve 222, the impeller 216, a drain valve useable to remove the contents of the reaction space 212, a supply valve useable to supply a new charge of solution to the reaction space 212 or the like. Alternatively, one or more alarms can be triggered, such as an indicating device being activated, to acquire the attention of one or more monitoring personnel. It should also be appreciated that, if the statistical information is not desired or needed, step S1600 can be omitted.

The exemplary method according to this invention outlined above with respect to FIG. 4, and especially step S1200, is based on the assumption that the object to be extracted or segmented has known spatial and/or dimensional relationships. For example, a high-aspect-ratio, rod-like or needle-like object can be approximated as a group of two or more spatially adjacent lines having similar spatial orientations and similar lengths. It should be appreciated that other types of objects can have other types of known spatial or dimensional relationships. For example, while needle-like or rod-like objects such as crystals have edges that are generally relatively long, substantially parallel over their length, and spaced closely together, other types of objects may have other spatial and/or dimensional relationships. For example, tetrahedral or cubic objects will typically have edges that are within a defined range of angular orientations to each other, that are overlapping for a significant portion of their length, and that have a well defined range of possible lengths. It should be appreciated that, as long as the relationships of the edges of the objects can be well defined and will appear in the image generally over well defined ranges, systems and methods according to this invention can be used to locate and segment such objects from the background and/or foreground portions of the acquired image. Accordingly, in step S1200, the image is inspected to identify image features. Then, in steps S1300 and S1400 the identified image features are analyzed to locate image features that satisfy the particular spatial and/or dimensional relationships.

Line segments are commonly used as inputs to higher-level processes in automated image analysis methods. Accordingly, many different methods have been developed for extracting line segments from images. These methods can be roughly divided in to three categories: 1) Hough-transform based methods, 2) methods based on edge-linking followed by line segment grouping, and 3) gradient-based methods. Various exemplary embodiments of systems and methods according to this invention use a particular type of gradient-based method, the Burns line finder, as disclosed in "Extracting Straight Lines," J. B. Burns et al, IEEE Trans. Pattern Anal. Machine Intell., 8(4); 425-455, July 1986, which is incorporated herein by reference in its entirety. The inventors have discovered that, for the low quality, noisy images and/or images of high-aspect-ratio objects for which systems and methods according to this invention are particularly useful, the Burns line finder is advantageous over Hough-transform based methods, because it is scale-independent, has lower computational and memory requirements, and finds line end points more readily. The Burns line finder is unique in that it detects lines on the basis of image intensity gradient direction, whereas most line-finders are based on image intensity gradient magnitude. Accordingly, the Burns line finder is able to detect subtle linear features that would be missed by other line finding techniques.

As outlined above, images analyzable using systems and methods according to this invention include in situ images acquired by viewing the interior of the reaction vessel 210 through the optical flat 214. Typically, a light source is directed through the optical flat 214 and the light reflecting off the various crystals within the reaction space 212 of the reaction vessel 210 is directed back to the image capture device 230. It should be appreciated that the amount of light directed back to the image capture device 230, i.e., the brightness of the image, and the contrast in the image, are typically functions of the instantaneous solids concentration within the solution within the reaction vessel 210.

That is, when most of the chemicals are still in solution and few crystals have formed, the absence of opaque, reflective material results in only a small amount of light being reflected and returning to the image capture device. Thus, the images typically are dim. As the crystallization reaction continues, the solids concentration of the solution continues to increase, as do the number and size of the crystals. As the solids concentration increases, less of the light penetrates deeply in to the reaction vessel 210. In addition, the light that does penetrate into the reaction vessel 210 typically reflects off a crystal suspended in the crystallization solution. This light is rarely directed back towards the image capture device 230. Rather, this light is typically reflected laterally or deeper in to the solution.

Thus, as the solids concentration increases, both the brightness and the overall contrast in the image can change significantly. Because the contrast and brightness of the image vary substantially during the crystallization process, methods that rely on the contrast magnitude, which is a function of overall contrast and image brightness, becomes problematic. To use such methods, the parameters for the gradient magnitude image intensity analysis need to be continually adjusted based on the instantaneous solids concentration. This, of course, is extremely difficult. It should be appreciated that any other image, beyond in situ images, where the brightness, the contrast, the lighting conditions, the focus, and/or any other parameter that affects the quality of the image, can vary in unknown and/or uncontrolled ways, can also be analyzed using systems and methods according to this invention.

In contrast, the image intensity gradient direction rarely changes significantly, regardless of any variation in the image intensity and in the overall image contrast. That is, the image intensity gradient direction is typically insensitive to changes in contrast and/or to changes in brightness. Thus, the image intensity gradient direction technique is particularly useful when analyzing low quality, noisy, poorly lit images, images taken when the lighting conditions are unknown or uncontrolled, or the like. However, it should be appreciated that image intensity gradient magnitude techniques can be used so long as the image intensity and the image contrast of the captured images are appropriately adjusted or otherwise compensated for.

Figure 5:
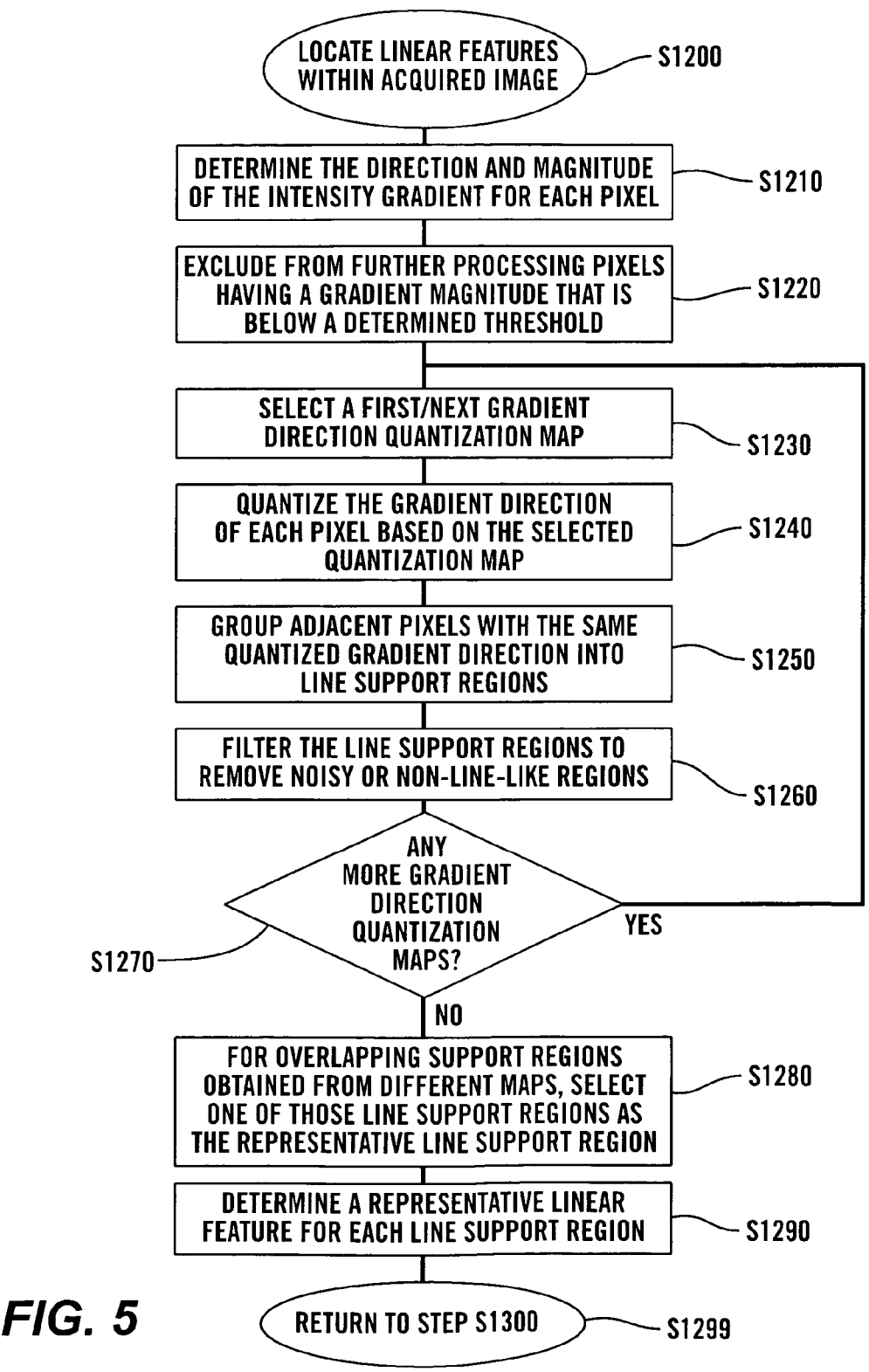
FIG. 5 is a flowchart outlining one exemplary embodiment of a method for locating linear features within an image according to this invention.
Figure 13:
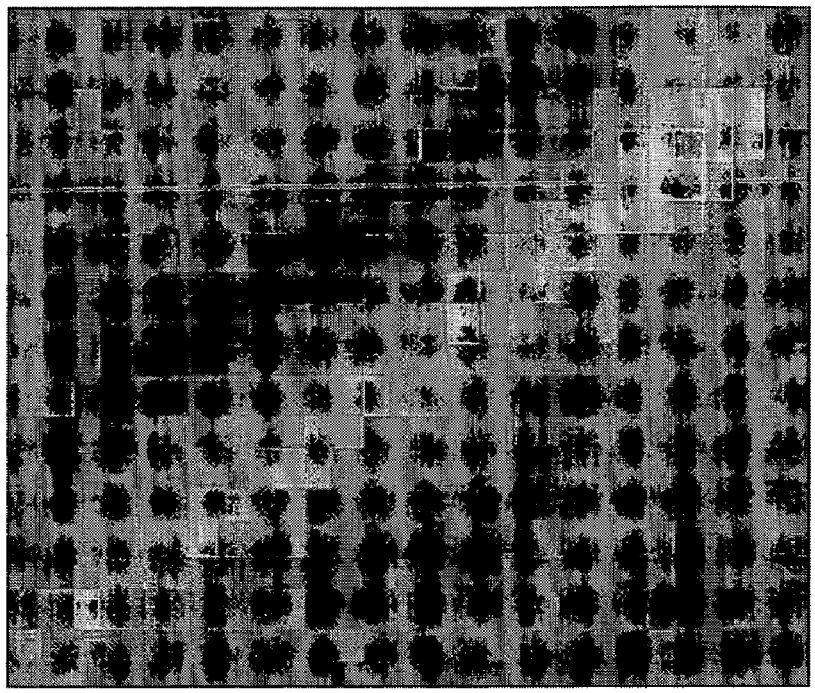
FIG. 13 illustrates one exemplary image containing an object edge to be segmented according to this invention.

FIG. 5 outlines one exemplary embodiment of a method according to this invention for locating linear features within the acquired image. As shown in FIG. 5, beginning in step S1200, operation continues to step S1210, where the direction and magnitude of the intensity gradient is determined for each pixel. This can be most easily seen in FIGS. 13 and 14. FIG. 13 shows an enlarged portion of an acquired image, where the individual pixels can be seen. The image gradient is a function of the image values, where low image values correspond to dark areas and high image values correspond to light areas. The gradient direction typically points from the low image value pixels towards the high image value pixels.

Figure 14:
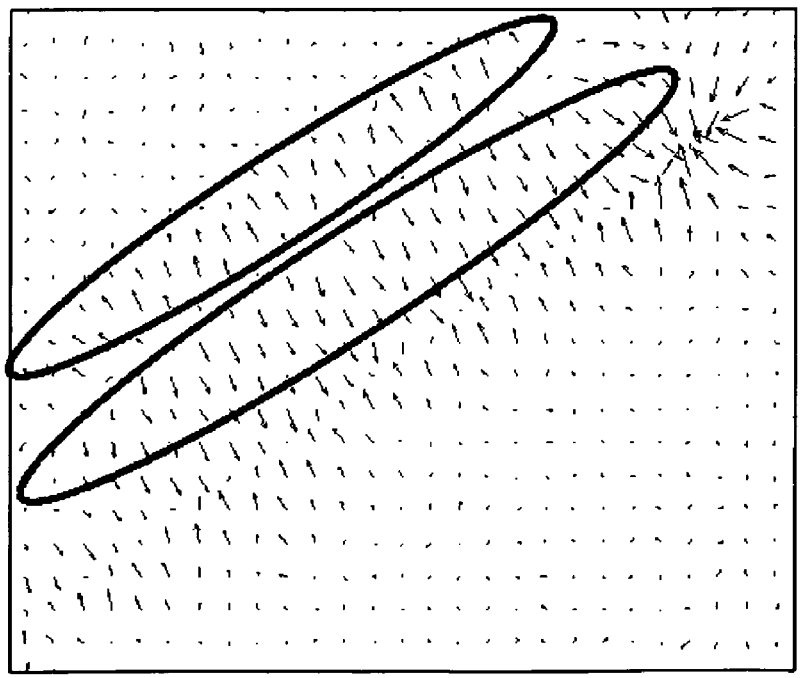
FIG. 14 is a graph illustrating gradient directions obtained by analyzing the image shown in FIG. 13.

For the image portion shown in FIG. 13, the direction of the image gradient is determined according to the technique disclosed in the incorporated Burns reference, resulting in the gradient map shown in FIG. 14. In the portion of image data shown in FIG. 13, a streak of relatively darker pixels extends from around the mid-point of the left side of the image to about the mid-point of the top side of the image. Parallel to that relatively darker streak, a relatively lighter streak extends from the lower left hand corner to the upper right hand corner of the image. The gradient direction typically extends from a relatively darker pixel to a relatively lighter pixel. Because, as outlined above, pixel values typically decrease to indicate darker image regions, the gradient direction typically extends from pixels having relatively low image values to pixels having relatively high image values.

As shown in FIG. 14, in the upper left hand and lower right hand corners, because the pixels all have similar image values the gradient direction is typically nonexistent or randomly oriented relative to the adjacent pixels. However, in the diagonal region extending from the upper right to the lower left portions of the image, there are two regions where the image gradient points in roughly the same direction over sets of pixels that are at least touching on their vertices. Because, as outlined above, the gradient direction typically extends from relatively higher valued pixels to relatively lower valued pixels, the two circled regions in FIG. 14 correspond to the image gradient directions extending from the relatively darker streak shown in FIG. 13.

Next, in step S1220, pixels having a gradient magnitude that is below a determined threshold are excluded from further processing. Referring to FIG. 14, the regions in the upper left hand corner and the lower right hand corner, while having gradient directions, have very small changes in image value. Thus, these regions have relatively small gradient magnitudes and thus are excluded from further processing.

Then, in step S1230, a first or next gradient direction quantization map is selected. Operation then continues to step S1240. It should be appreciated that the gradient direction, which can take any value between 0° and 360°, can be divided into any number of quantization sets, and that the 0° point of the circle can be set at any location. It should further be appreciated that, because the gradient direction divisions and the orientation of the 0° direction are somewhat arbitrary, it is possible to divide the pixels associated with a single edge in the image between two quantization groups based on small variations in the gradient direction. Multiple gradient direction maps can be used to avoid this problem.

In various exemplary embodiments of systems and methods according to this invention, the 360° gradient circle is divided into six 60° quantization sectors. To create two different quantization maps, two different 0° starting points, offset by 30°, are selected. However, it should be appreciated that any number of different quantization maps, with different 0° starting positions, different numbers of divisions, or bins, extending over different angular ranges and the like can be used to create any set of desired quantization maps.

In step S1240, the gradient direction of each pixel is quantized based on the selected quantization map. Then, in step S1250, adjacent pixels with the same quantized gradient direction, i.e., pixels grouped into the same 60° division or bin, are grouped into one or more line support regions. Next, in step S1260, the line support regions are filtered to remove noisy and/or non-line-like regions. Operation then continues to step S1270.

It should be appreciated that, in step S1250, the adjacent pixels are grouped based on connected component analysis. In various exemplary embodiments of systems and methods according to this invention, 8-way connectivity is allowed, such that pixels touching only at a single vertex point having the same quantized gradient are nevertheless grouped into the same line support region. It should be appreciated that the connected component analysis can be limited to 4-way connectivity, such that only pixels that share an edge are grouped together into line support regions. However, this is likely to lead to line support regions that are inappropriately small. It should also be appreciated that step S1260 is optional. Thus, step S1260 could be skipped and the noisy or non-line-like regions left in the set of line support regions developed in step S1250. In this case, operation would continue directly from step S1250 to step S1270.

In step S1270, a determination is made whether there are any more gradient direction quantization maps that need to be applied to the determined gradient directions for the image pixels. If so, operation returns to step S1230, where a next gradient direction quantization map is selected. Otherwise, if all of the gradient direction quantization maps have been applied, operation continues to step S1280. In step S1280, for any line support regions, which were generated based on one gradient direction quantization map, that overlap one or more other line support regions that were generated from other gradient direction quantization maps, one line support region of each such set of overlapping line support regions is selected as the representative line support region for that set of overlapping line support regions. It should be appreciated that, in various exemplary embodiments, this selection is done according to the technique outlined in the incorporated Burns reference. It should further be appreciated, that if only a single quantization direction gradient map is implemented, steps S1270 and S1280 can be omitted. In this case, operation would continue directly from step S1250 or step S1260 (as outlined above) to step S1290.

In step S1290, a representative linear feature is determined for each line support region. In various exemplary embodiments, this is done by blob analysis, where, for each line support region, an ellipse, having the same geometric moments as that line support region, is determined. In various exemplary embodiments, for each line support region, the properties of the best-fit ellipse for that line support region are used as the properties of that line support region. That is, the major axis of the best-fit ellipse is used as the representative line, where its length is the length of the major axis, its orientation is the orientation of the major axis, its centroid is the center of the major axis, and the length of the minor access of the ellipse is the width of the representative line.

Figure 15:
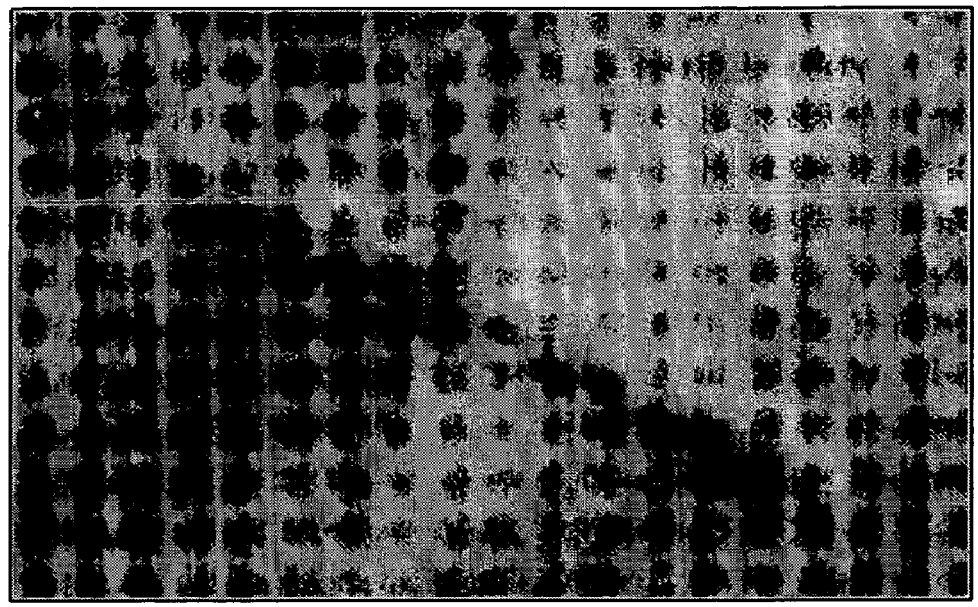
FIG. 15 shows an enlarged portion of the image shown in FIG. 2.
Figure 16:
FIG. 16 illustrates one exemplary embodiment of a set of connected components generated from the image shown in FIG. 15 obtained by applying steps S1210-S1250 to that image.

This process is shown in FIGS. 15-18. In particular, FIG. 15 shows, in greater detail, the region 110 of the acquired image 100 shown in FIG. 2. FIG. 16 shows 15 line support regions identified by applying steps S1210-S1280 to the image shown in FIG. 15.

Figure 17:
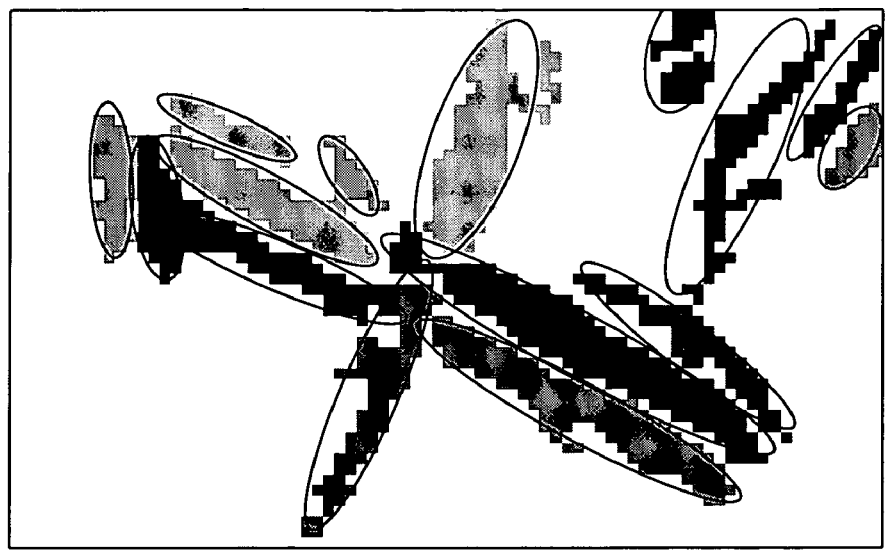
FIG. 17 illustrates one exemplary embodiment of mathematical represents for the connected components shown in FIG. 16.
Figure 18:
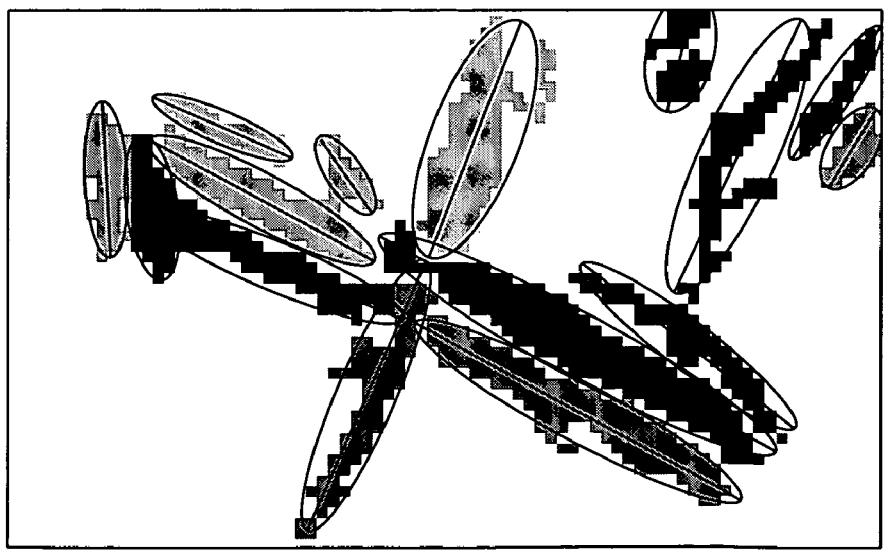
FIG. 18 illustrates one exemplary embodiment of linear features extracted from the mathematical representations shown in FIG. 17.
Figure 19:
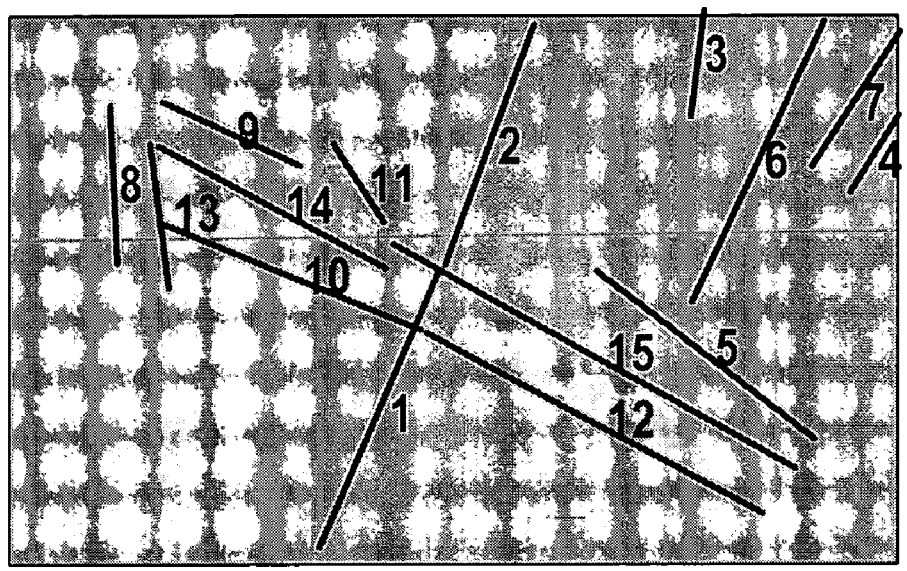
FIG. 19 shows the image shown in FIG. 15 with the linear features shown in FIG. 18 superimposed on it.

FIG. 17 shows the best fit ellipses determined for each of the 15 line support regions shown in FIG. 16. FIG. 18 shows the best fit ellipses and their major axes superimposed on the line support regions shown in FIG. 16. FIGS. 17 and 18 thus illustrate one exemplary embodiment of determining the representative linear feature for each line support region of step S1290. FIG. 19 shows the linear features determined in step S1290 superimposed over the original image data shown in FIG. 15, with each of the representative linear features labeled 1-15 for the 15 identified line support regions shown in FIG. 16.

Figure 6:
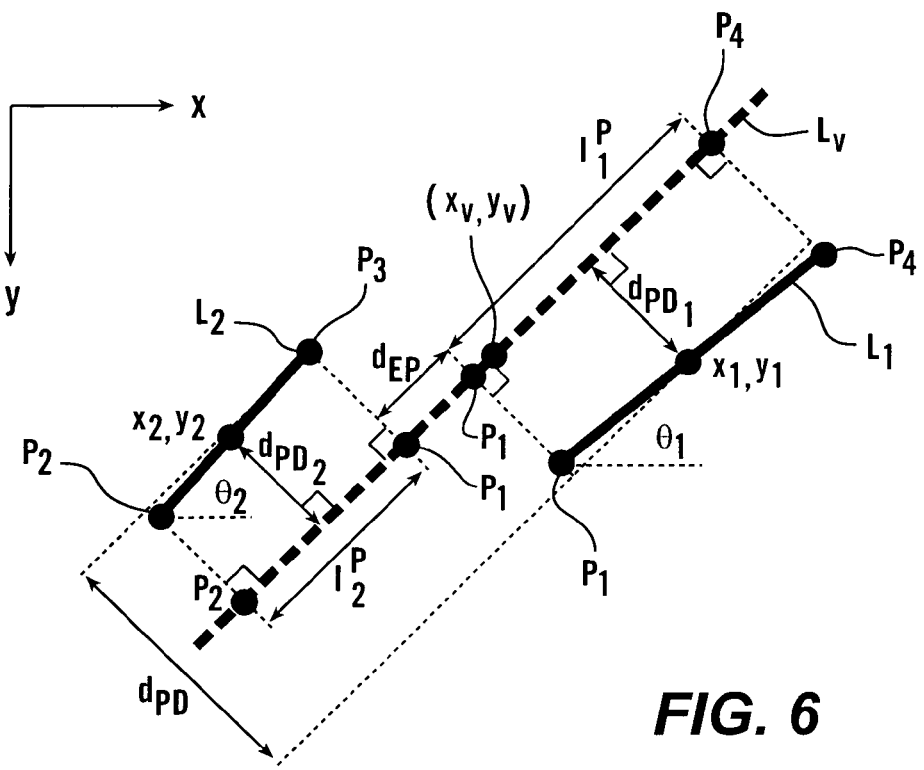
FIG. 6 illustrates one exemplary embodiment of how various line parameters are defined.

FIG. 6 shows a pair of linear features $L_1$ and $L_2$ that are representative of a pair of line-like regions that have been extracted from a sample image. Each of the linear features $L_1$ and $L_2$ have an orientation $\theta_1$ and $\theta_2$, respectively, that defines the angle that the linear features $L_1$ and $L_2$ make with respect to some reference line in the image. Because these images are typically digital images comprising a 2-dimensional array of pixels, the reference line is typically either horizontal or vertical. However, it should be appreciated that the reference line can be at any angle, as the important aspect is not the absolute orientation of each of the lines with respect to the reference line, but rather the relative orientation of the lines to each other. Thus the important feature is the angular difference $\Delta\theta$, which is defined as the absolute difference between the two orientations $\theta_1$ and $\theta_2$, or:

$$\Delta\theta = |\theta_1 - \theta_2|.$$

As a result, the absolute orientation of each linear feature $L_1$ and $L_2$ to the reference line drops out of the equation and is thus irrelevant.

In addition to the relative orientation between the two linear features, the line lengths $l_1$ and $l_2$ and the spatial positions of the linear features $L_1$ and $L_2$ relative to each other are also useful information. Thus, the perpendicular distance $d_{PD}$ between the linear features $L_1$ and $L_2$ defines their lateral spatial offset. If the perpendicular distance $d_{PD}$ is 0, the lines are co-linear. Since it is highly unlikely many lines will be truly co-linear, a threshold value $\epsilon_{PD}$ is typically designated such that, when the perpendicular distance $d_{PD}$ is less than the threshold $\epsilon_{PD}$, the lines $L_1$ and $L_2$ are considered to be co-linear. It should be appreciated that the perpendicular distance $d_{PD}$ can be determined in a variety of ways. For example, the perpendicular distance $d_{PD}$ can be determined by extending one line to a point that is perpendicular to one end point of the other line and taking the perpendicular distance at that point. Moreover, this can be done for both linear features and the two perpendicular distances can then be combined and averaged to find an average perpendicular distance. It should be appreciated that any other appropriate method for determining the perpendicular distance $d_{PD}$ can be used. Likewise, an end point distance $d_{EP}$ is determined to indicate how far apart the nearest end points of the two linear features $L_1$ and $L_2$ are. Because there is always some uncertainty in determining the end points of the linear features, $L_1$ and $L_2$, the linear features $L_1$ and $L_2$ can be considered to be overlapping if the end point distance $d_{EP}$ is negative, or 0, or even positive if the end point distance $d_{EP}$ is within an end point threshold $\epsilon_{PD}$.

As indicated above, once the various linear features are extracted from the acquired image, the spatial relationships between sets of two or more of the linear features are examined to: 1) determine if the linear features are co-linear, and thus represent portions of the same edge feature of the object depicted in the acquired image, or: 2) have the appropriate spatial relationship such that the linear features represent two different yet related edges on the same object. In various exemplary embodiments according to this invention, these spatial parameters include orientation offset along the direction the lines extend in, and offset perpendicular to the linear features.

As shown in FIG. 6, for any pair of two linear features $L_1$ and $L_2$, each linear feature $L_1$ and $L_2$, respectively, will have an orientation $\theta_1$ and $\theta_2$ relative to some reference line in the image. Each of the linear features $L_1$ and $L_2$ will also have respective mid-points $(x_1, y_1)$ and $(x_2, y_2)$. As outlined above, there are various ways to determine these spatial parameters.

FIG. 6 illustrates one exemplary embodiment of a technique for determining these parameters according to this invention. In particular, as shown in FIG. 6, a virtual line $L_v$ is defined between the two linear features $L_1$ and $L_2$. In particular, the virtual line $L_v$ is defined by determining the length-weighted averages of the positions and orientations of the linear features $L_1$ and $L_2$. Thus, the orientation $\theta_v$ and the mid-point or centroid $(x_v, y_v)$ of the virtual line $L_v$ are defined as:

$$x_v = \frac{(l_1 * x_1) + (l_2 * x_2)}{l_1 + l_2} \quad (1)$$

$$y_v = \frac{(l_1 * y_1) + (l_2 * y_2)}{l_1 + l_2} \quad (2)$$

$$\theta_v = \frac{(l_1 * \theta_1) + (l_2 * \theta_2)}{l_1 + l_2} \quad (3)$$

where:

$l_1$ and $l_2$ are the lengths of the linear features $L_1$ and $L_2$;

$\theta_1$ and $\theta_2$ are the orientations of the linear features $L_1$ and $L_2$;

$x_1$ and $x_2$ are the x-axis positions of the midpoints or centroids of the linear features $L_1$ and $L_2$; and $y_1$ and $y_2$ are the y-axis coordinates of the mid-points of the linear features $L_1$ and $L_2$.

As shown in FIG. 6, the two linear features $L_1$ and $L_2$ have, respectively, end points $p_1$ and $p_4$, and $p_2$ and $p_3$. Each of these end points is perpendicularly projected onto the virtual line $L_v$ as the points $p_1$-$p_4$. The length $l_v$ of the virtual line $l_v$ is defined as the shortest line that includes all of the projected end points $p_1$-$p_4$, i.e., in the example shown in FIG. 6, the line extending from $p_2$ to $p_4$.

Figure 7:
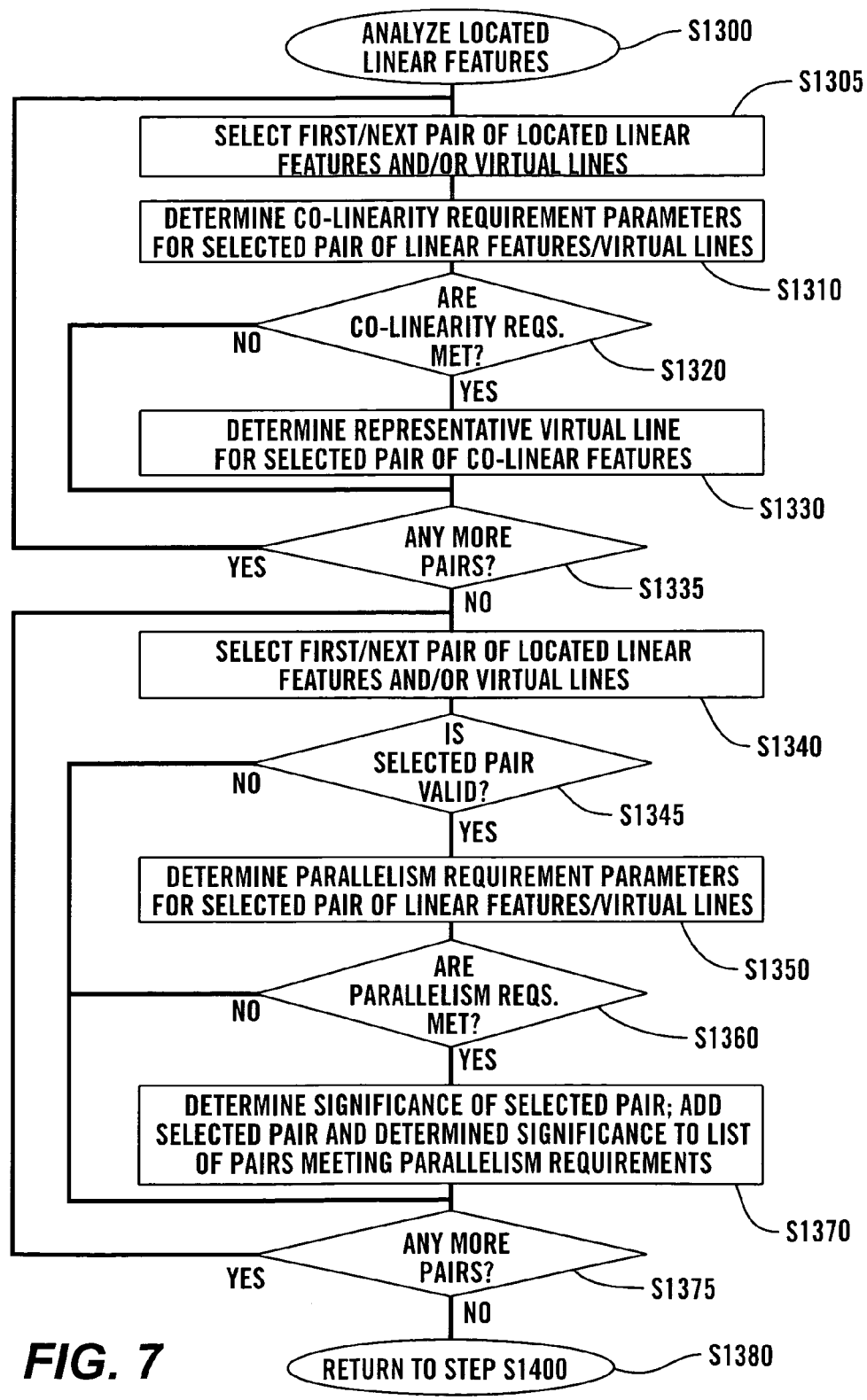
FIG. 7 is a flowchart outlining a first exemplary embodiment of a method for analyzing the located linear features according to this invention.

FIG. 7 is a flowchart outlining a first exemplary embodiment of a method for analyzing the located linear features according to this invention. As shown in FIG. 7, beginning in step S1300, operation continues to step S1305, where a first or next pair of located linear features and/or virtual lines, which will be described below with respect to step S1330, are selected. Then, in step S1310, one or more co-linearity parameters are determined for the selected pair of linear features and/or virtual lines. Next, in step S1320, a determination is made whether the determined co-linearity requirements are met by the determined co-linearity parameters for selected pair of linear features and/or virtual lines. If so, operation continues to step S1330. Otherwise, operation jumps directly to step S1335.

In step S1330, a representative virtual line is determined for the selected pair of co-linear linear features and/or virtual lines, as outlined above with respect to FIG. 6. Operation then continues to step S1335, where a determination is made whether there are any more pairs that need to be selected. If so, operation jumps back to step S1305. Otherwise, operation continues to step S1340.

It should be appreciated that, in various exemplary embodiments of systems and methods according to this invention, only pairs of linear features are selected and analyzed in steps S1305-1330. Thus, in such exemplary embodiments, each virtual line represents exactly two lines that are determined to be co-linear. While this is usually sufficient, it may be desirable to generate virtual lines that represent the combination of three or more lines that meet the co-linearity requirements. This may be desirable when analyzing extremely noisy or poorly lit images, images anticipated to have many overlapping objects, or images having extremely long objects, where it may be difficult to generate at most two lines that represent the full extent of the length of the object.

Accordingly, in various other exemplary embodiments, after a virtual line is created in step S1330, that first virtual line is added back into the list of linear features and is used as one element with each of the other linear features to determine if any of the other linear features, when paired with that first virtual line, also meet the co-linearity requirements. If so, in various exemplary embodiments, a second virtual line is created that represents the combination of the first virtual line with the selected linear feature. That first virtual line may be maintained or may be discarded. In various other exemplary embodiments, a second virtual line is created that represents the virtual line generated from all three (or more) linear features. Again, the first virtual line may be maintained or may be discarded.

In various other exemplary embodiments, after all of the pairs of linear features have been selected and all of the virtual lines for those linear features have been generated, the virtual lines are examined to determine if any pair of virtual lines contains the same linear features. If so, a new virtual line is created, as outlined above with respect to FIG. 6, using the two virtual lines instead of two linear features. This process can, of course, then be repeated to determine if the new virtual line shares a constituent linear feature with any other virtual lines. If so, the process can be repeated. It should be appreciated, that in such exemplary embodiments, the original virtual lines can either be maintained or discarded as desired.

In step S1340, a first or next pair of elements, selected from the located linear features and/or the virtual lines, is selected. Thus, this pair of elements can have either two linear features, two virtual lines, or one linear feature and one virtual line.

Next, in step S1345, a determination is made whether the selected pair of elements is valid. If not, operation jumps directly to step S1375. Otherwise, if the selected pair of elements is valid, operation continues to step S1350.

It should be appreciated that a selected pair of elements is valid if it contains two linear features. A selected pair of elements is also valid if it contains a linear feature and a virtual line that does not contain the selected linear feature as a constituent linear feature of that virtual line. Finally, a selected pair of virtual lines is valid so long as the same linear feature does not appear in the set of constituent linear features for both virtual lines. Thus, a selected pair of elements would be invalid if a virtual line C was developed from linear features A and B, and the pair comprised the virtual line C and either of the linear features A or B. The selected pair of elements would also be invalid if the virtual line C discussed above was paired with a virtual line E that was developed from linear features A and D. Since the linear feature A is a constituent of both the virtual lines C and D, the virtual lines C and D form an invalid pair.

In step S1350, one or more parallelism parameters for the selected pair of linear features and/or virtual lines are determined. Next, in step S1360, a determination is made whether the determined parallelism requirements are met. If so, operation continues to step S1370. Otherwise, operation jumps directly to step S1375.

It should be appreciated that the "parallelism" requirements will typically change depending on the expected spatial relationships between the edges of the objects appearing in the acquired images. For example, for high-aspect-ratio crystals or other high-aspect-ratio objects, the linear features and/or virtual lines are typically desirably parallel, or within a few degrees of parallel. In contrast, in other types of structures, the linear features may meet at an angle. For example, a tetrahedral crystal will have the edges meeting within a defined angular range based on the last structure of the crystal. While the linear features will not be parallel, they will need to be within a few degrees of the appropriate angle to properly be considered as potential lines representing the edges of the crystal.

In step S1370, because the parallelism requirements have been met in step S1360, a significance measure is determined for the selected pair of elements and the selected pair of elements and their determined significance value are added to a list of pairs of elements that meet the parallelism requirements. Then, in step S1375, a determination is made whether any more pairs of linear features and/or virtual lines need to be selected and analyzed. If so, operation returns to step S1340. Otherwise, operation continues to step S1380, which returns operation of the method to step S1400.

Figure 20:
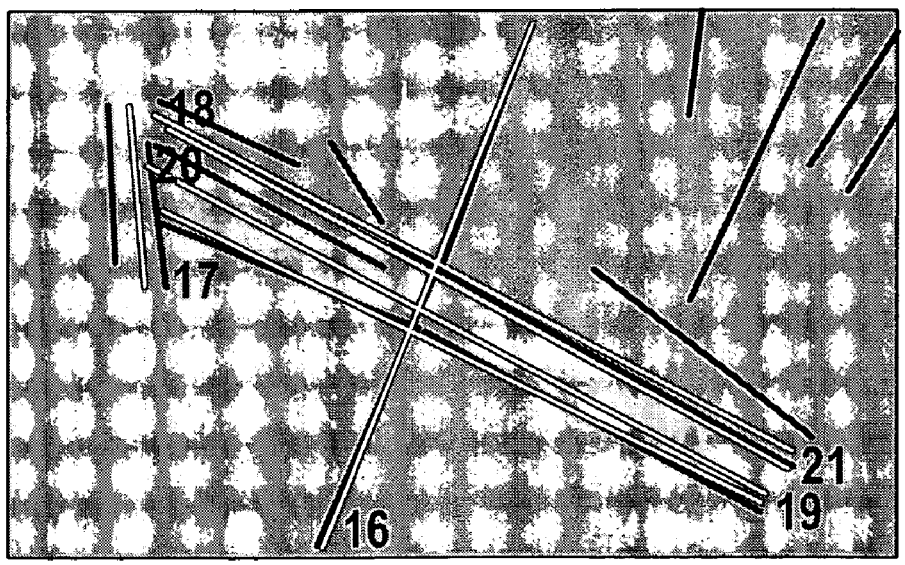
FIG. 20 illustrates the virtual lines generated after analyzing the linear features shown in FIG. 19 based on the co-linearity requirements.

FIG. 20 illustrates the virtual lines determined from the linear features shown in FIG. 19. In particular, the virtual lines shown in FIG. 20 were determined by using only linear features to determine the virtual lines. That is, no pairs of virtual lines with either linear features or other virtual lines were used to determine the virtual lines shown in FIG. 20. As shown in FIG. 20, six pairs of the linear features shown in FIG. 19 meet the co-linearity requirements, resulting in the six virtual lines 16-21 shown in FIG. 20. In particular, virtual line 16 corresponds to linear features 1 and 2, virtual line 17 corresponds to linear features 8 and 13, virtual line 18 corresponds to linear features 9 and 15, virtual line 19 corresponds to linear features 10 and 12, virtual line 20 corresponds to linear features 12 and 14, and virtual line 21 corresponds to linear features 14 and 15.

Figure 21:
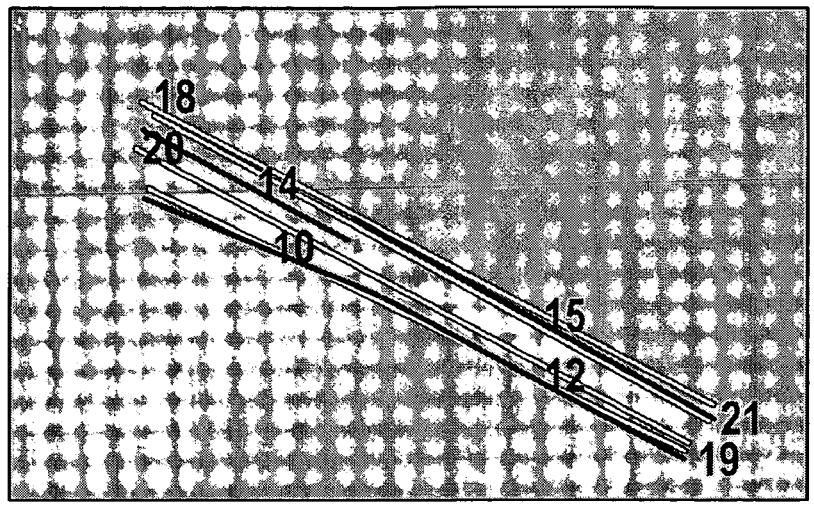
FIG. 21 illustrates the sets of virtual lines and/or linear features identified after analyzing the linear features and virtual lines based on the parallelism requirements.

FIG. 21 shows the pairs of linear features and or virtual lines that met the parallelism requirements and thus the pairs of elements for which significance measure values were determined. In the exemplary embodiment shown in FIG. 21, these pairs of linear features and/or virtual lines include linear feature pairs 10 and 14, and 12 and 15, and virtual line pairs 18 and 19, 18 and 20, and 19 and 21. It should be appreciated that, although they would meet the parallelism requirements, virtual line pairs 19 and 20, 18 and 21, and 20 and 21 are not valid, and thus were skipped. In particular, lines 18 and 21 share linear feature 15, while virtual lines 19 and 20 share linear feature 12 and virtual lines 20 and 21 share linear feature 14.

Figure 8:
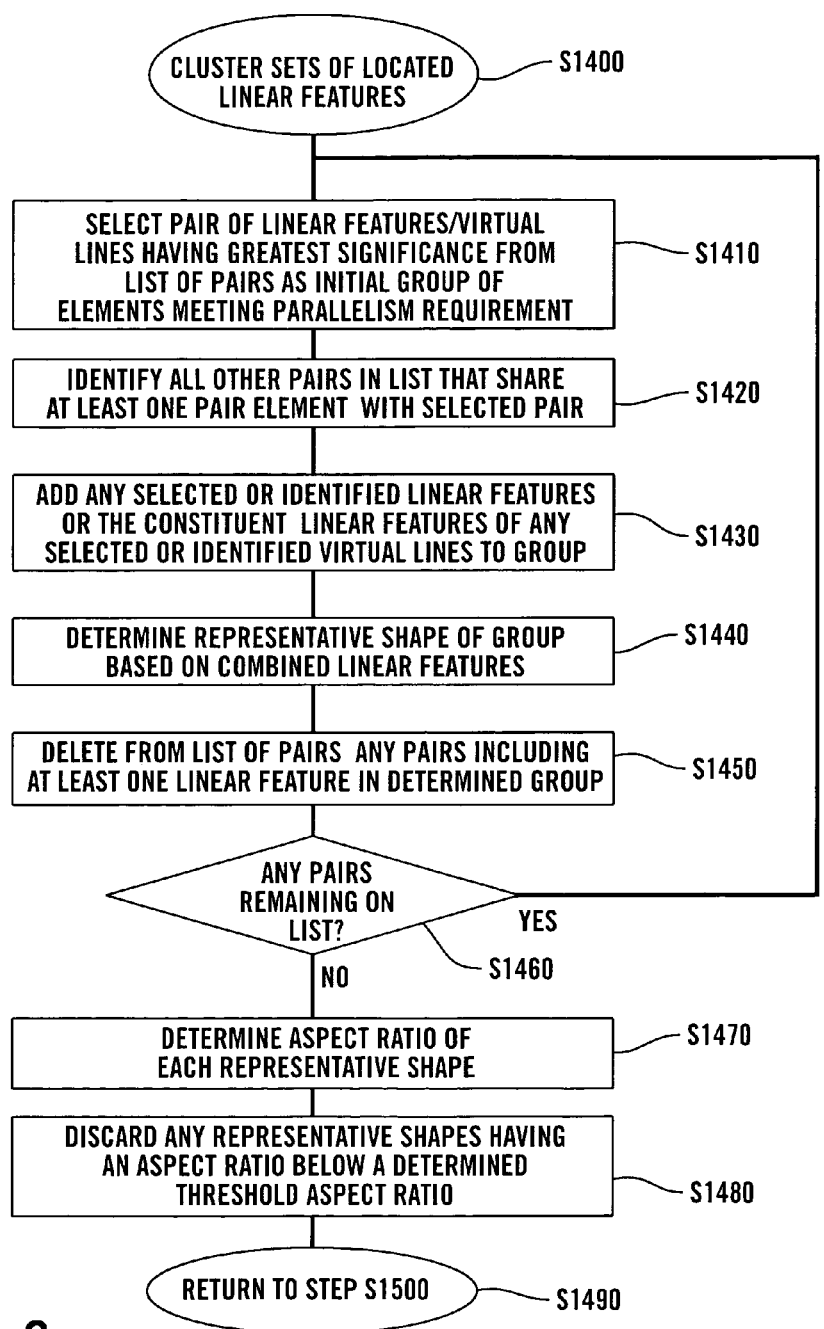
FIG. 8 is a flowchart outlining a first exemplary embodiment of a method for clustering the located linear features according to this invention.

FIG. 8 is a flowchart outlining a first exemplary embodiment of a method for clustering sets of located linear features according to this invention. As shown in FIG. 8, beginning in step S1400, operation of the method continues to step S1410, where the pair of linear features and/or virtual lines having the greatest significance measure value is selected from the list of pairs as an initial group of elements meeting the parallelism requirement. Then, in step S1420, all other pairs of linear features and/or virtual lines in the list of pairs of elements meeting the parallelism requirements, that also share at least one pair element with the selected pair, are identified. It should be appreciated that pair element refers both to virtual lines, when the selected pair includes one or two virtual lines, and/or linear features, when the selected pair contains one or more linear features. Next, in step S1430, any selected or identified linear features are added to the initial group of elements, while the constituent linear features of any selected or identified virtual line replace those virtual lines in the initial group of elements. Operation then continues to step S1440.

Figure 22:
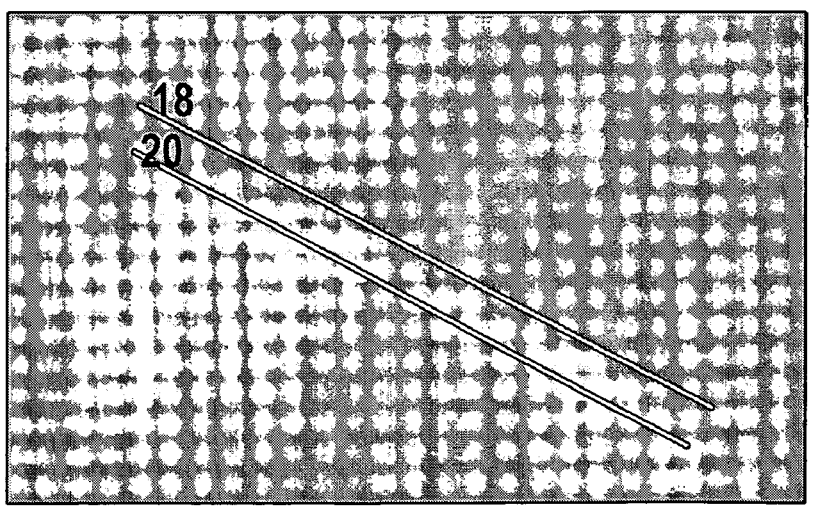
FIG. 22 illustrates the set of virtual lines and/or linear features having the greatest significance.
Figure 23:
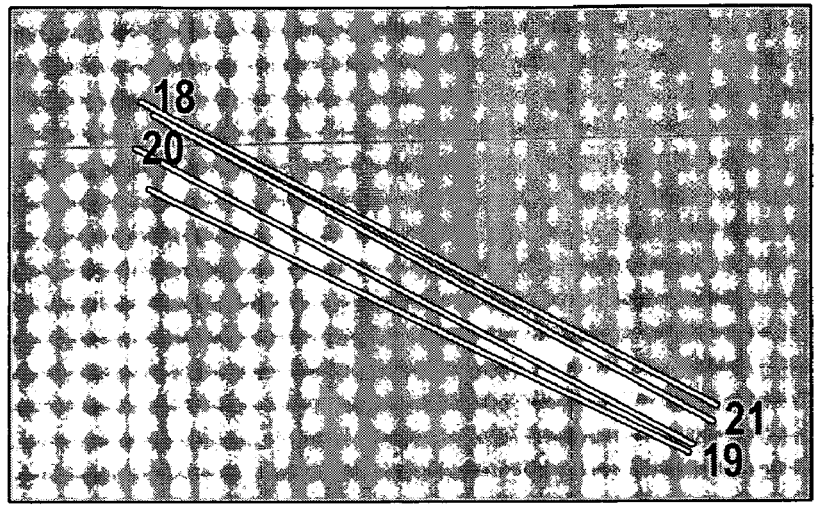
FIG. 23 illustrates the sets of additional virtual lines and/or linear features that intersect the set of virtual features having the greatest significance.
Figure 24:
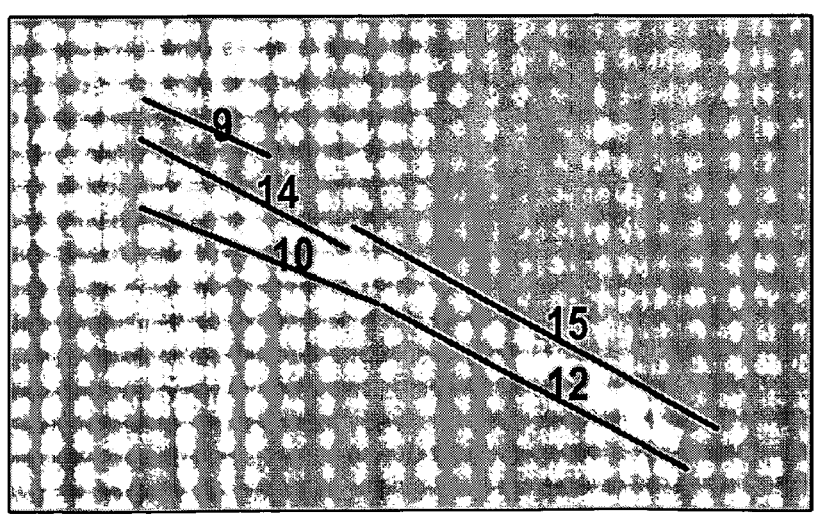
FIG. 24 illustrates the linear features associated with the identified sets of linear features and/or virtual lines shown in FIG. 23.

FIG. 22 illustrates the application of step S1410 to the virtual lines and linear features comprising the list of pairs meeting the parallelism requirements shown in FIG. 21. That is, the pair of linear features and/or virtual lines having the greatest significance is the pair of virtual lines 18 and 20. Because virtual line pairs 18 and 19, and 20 and 21, are also on the list of pairs of linear features and/or virtual lines that meet the parallelism requirements the virtual lines 19 and 21 are identified in step S1420. FIG. 23 shows the selected and identified virtual lines superimposed on the image data shown in FIG. 15. FIG. 24 shows the constituent linear features 9, 10, 12, 14 and 15 of the selected and identified virtual lines shown in FIG. 23 superimposed on the image of FIG. 15. FIG. 24 illustrates, that in step S1430, any virtual lines are replaced with their constituent linear features.

In step S1440, a representative shape and/or one or more representative lines for the group of linear features meeting the parallelism requirements are determined based on the constituent linear features of that group. In particular, in various exemplary embodiments, the underlying line support regions, i.e., the connected components, that those linear features are representative of are combined and a representative ellipse, having the same geometrical moments as the combined line support regions, is determined. As above, the properties of this best-fit ellipse are used as the properties of the corresponding representative shape. That is, the length of the ellipse's major axis is used as the length of the representative shape, the length of its minor axis is used as the width of the representative shape, its orientation is the orientation of the representative shape and its centroid is the center centroid of the representative shape.

Figure 25:
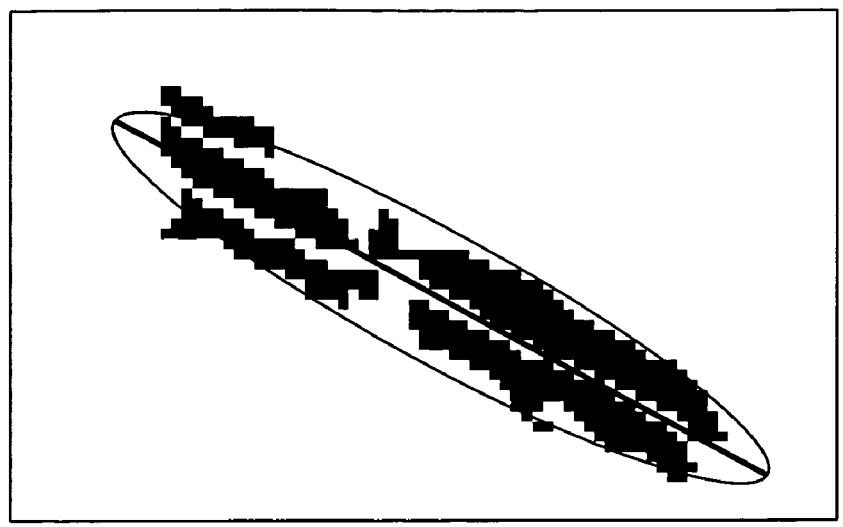
FIG. 25 illustrates the combined connected component associated with the identified linear features shown in FIG. 24 and the representative shape and line for that combined connected component.
Figure 26:
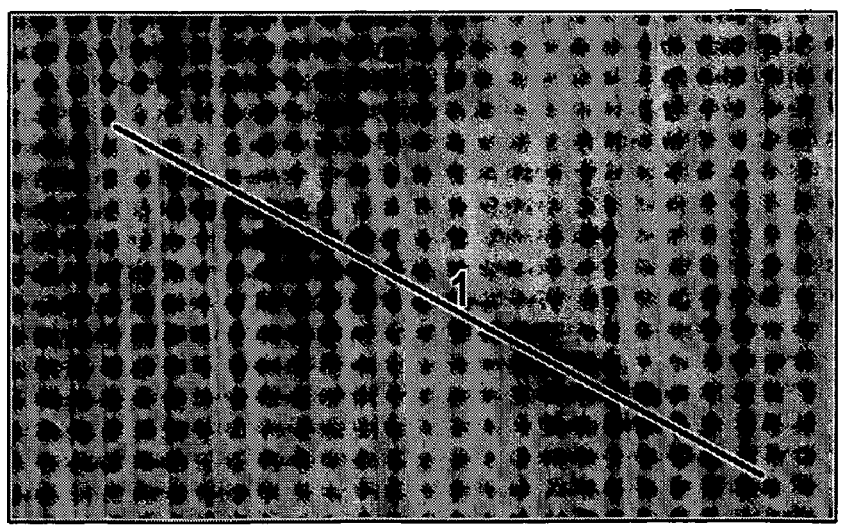
FIG. 26 shows the representative line superimposed on the image shown in FIG. 15.

FIG. 25 illustrates the connected component line support regions corresponding to the representative lines 9, 10, 12, 14 and 15 shown in FIG. 24 and the best-fit ellipse and its major axis superimposed over those line support regions. FIG. 26 shows the major axis, labeled 1, superimposed over the image data shown in FIG. 15.

Next, in step S1450, any pairs of elements within the list of pairs of elements meeting the parallelism requirement that include at least one linear feature in the determined group are deleted from the list of pairs of elements. For example, since the linear features 9, 10, 12, 14 and 15 are in the determined group, the pairs of virtual lines 18 and 19, 18 and 20, 19 and 21, and 20 and 21, as well as the pairs of linear features 10 and 14, and 12 and 15, are deleted from the list of pairs of elements meeting the parallelism requirements. Then, in step S1460, a determination is made whether any pairs remain on the list. If so, operation jumps back to step S1410, where the pair of linear features and/or virtual lines remaining on the list having the greatest significance measure value is selected. Otherwise, if there are no pairs remaining on the list, operation continues to step S1470. In the exemplary embodiment outlined above, looking just at the image data shown in FIG. 15, there are no pairs of elements remaining on the list, so operation would continue from step S1460 to step S1470.

In step S1470, the aspect ratio of each representative shape is determined. In various exemplary embodiments where the representative shape is a best-fit ellipse or the like, the aspect ratio is the ratio of the length of the major axis to the length of the minor axis. Then, in step S1480, any representative shapes having a determined aspect ratio that is below a determined threshold aspect ratio $\epsilon_{AR}$ are discarded. Operation then continues to step S1490, where operation returns to step S1500.

Figure 9:
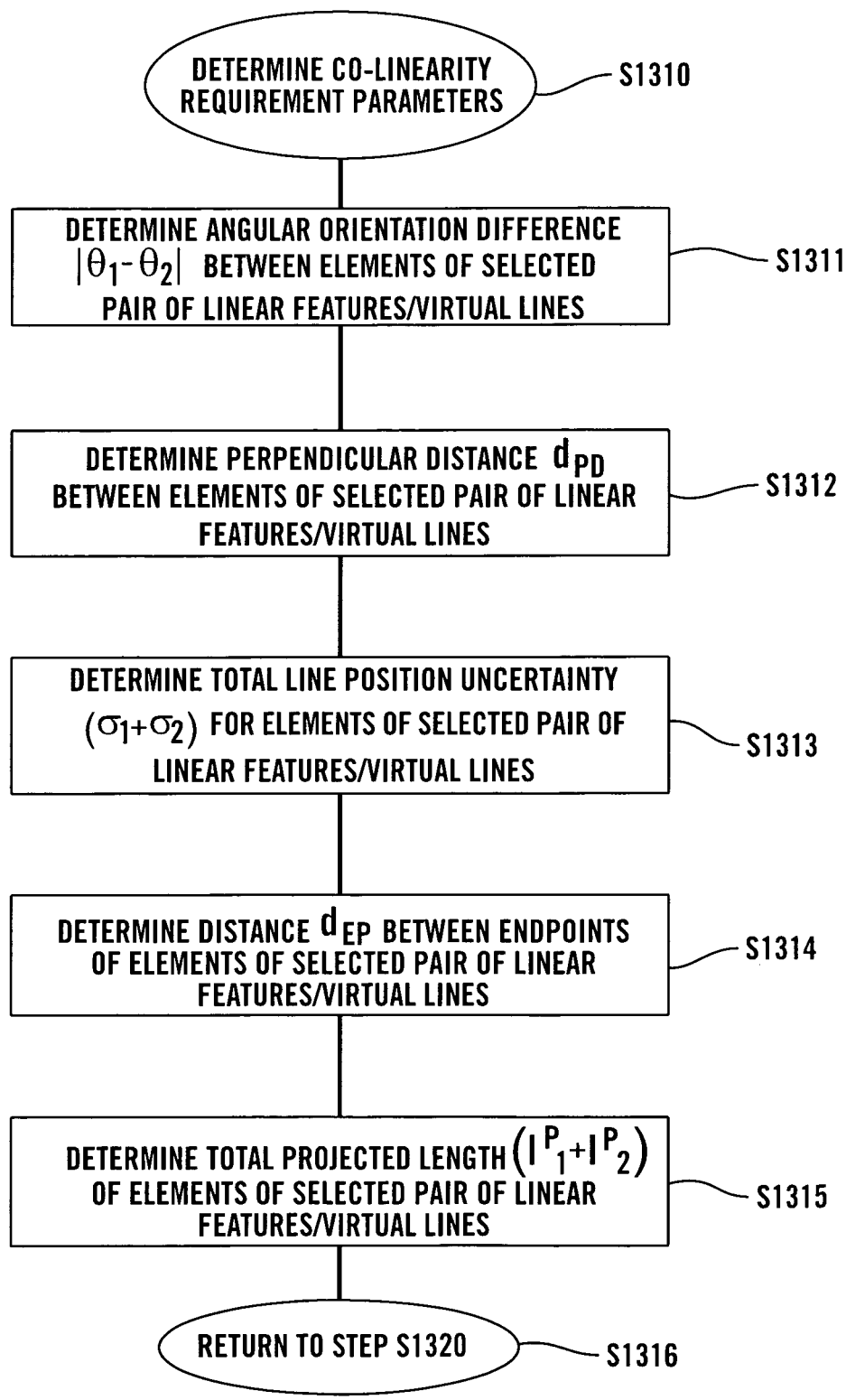
FIG. 9 is a flowchart outlining one exemplary embodiment of a method for determining co-linearity requirement parameters for sets of linear features.

FIG. 9 is a flowchart outlining one exemplary embodiment of the method for determining the co-linearity parameters of step S1310. As shown in FIG. 9, beginning in step S1310, operation continues to step S1311, where the angular orientation difference between the linear features (and/or virtual lines, if analyzed as described above) of the selected pair of linear features (and/or virtual lines) is determined as:

$$\Delta\theta = |\theta_1 - \theta_2|.$$

Then, in step S1312, the perpendicular distance $d_{PD}$ between the linear features (and/or virtual lines) of the selected pair of linear features (and/or virtual lines) is determined as shown in FIG. 6. Next, in step S1313, the total line position uncertainty $(\sigma_1 + \sigma_2)$ for the linear features (and/or virtual lines) of the selected pair of linear features (and/or virtual lines) is determined. The line position uncertainty values $\sigma_1$ and $\sigma_2$ for the two linear features (and/or virtual lines) 1 and 2 represents the uncertainty of the position of the elements 1 and 2, respectively, in the direction perpendicular to their length. In various exemplary embodiments, for linear features, the line position uncertainty $\sigma_1$ and $\sigma_2$ is assumed to be equal to one-half of the length of the minor axis of the best-fit ellipse for the corresponding linear feature. In various other exemplary embodiments, the line position uncertainty $\sigma_v$ for a virtual line $L_v$ is assumed to be one half of the length-weighted average of the uncertainties $\sigma_1$ and $\sigma_2$ of its constituent linear features $L_1$ and $L_2$. Operation then continues to step S1314.

In step S1314, the endpoint distance $d_{EP}$ between the endpoints of the linear features (and/or virtual lines) of the selected pair of linear features (and/or virtual lines) is determined as outlined above with respect to FIG. 6. Next, in step S1315, the total projected length $(l^p_1 + l^p_2)$ of the two linear features (and/or virtual lines) of the selected pair of linear features (and/or virtual lines) is determined as outlined above with respect to FIG. 6. Operation then continues to step S1316, which returns operation of the method to step S1320.

Figure 10:
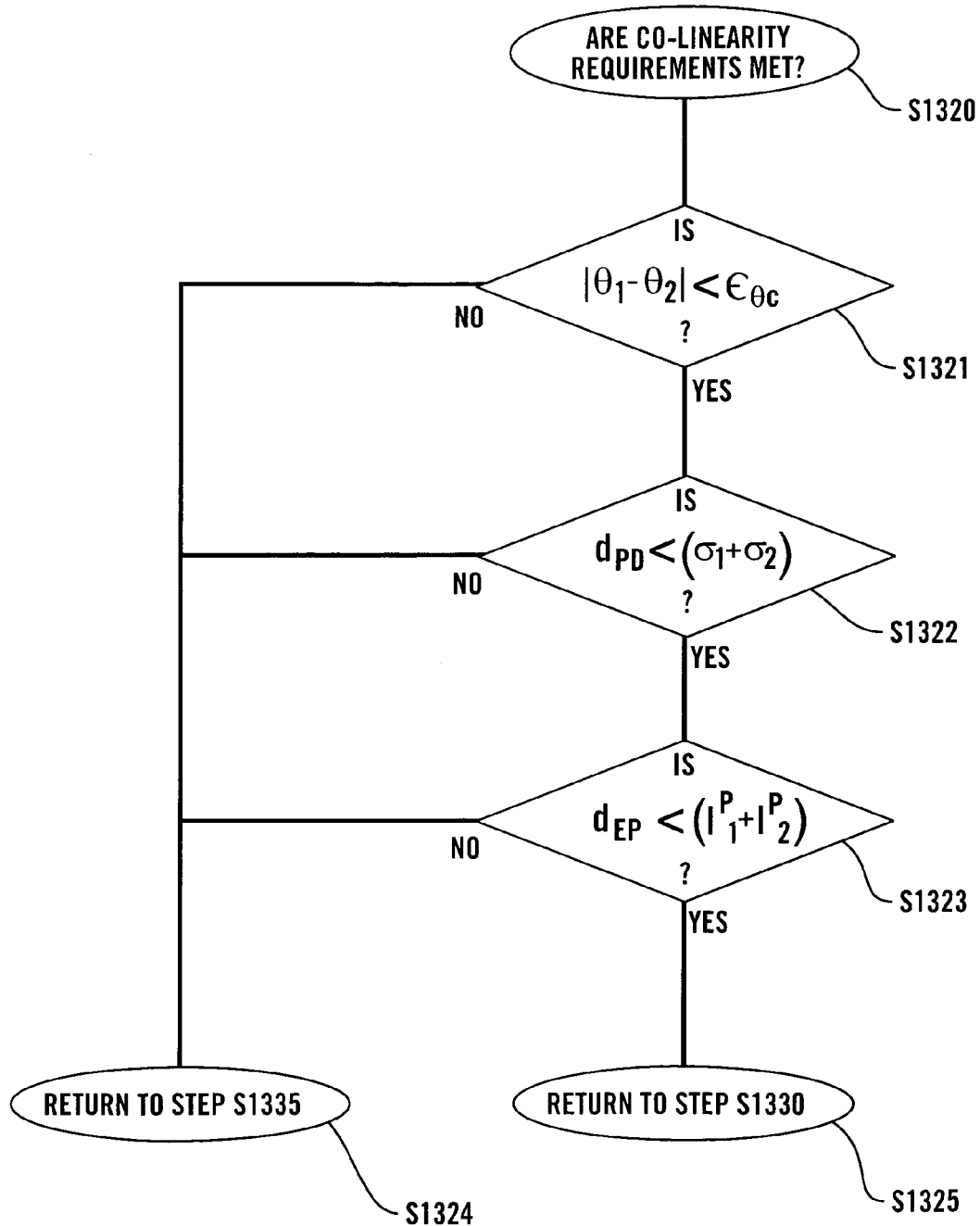
FIG. 10 is a flowchart outlining one exemplary embodiment of a method for determining if the co-linearity requirements are met.

FIG. 10 is a flowchart outlining one exemplary embodiment for the method for determining whether the co-linearity requirements of step S1320 are met. As shown in FIG. 10, operation of the method begins in step S1320 and continues to step S1321, where a determination is made whether the angular offset or difference Δθ meets the criterion:

$$\Delta\theta = |\theta_1 - \theta_2| < \epsilon_{\theta c},$$

where $\epsilon_{\theta c}$ is a user specified threshold that provides a limit on how large the angle can be between the linear features (and/or virtual lines) before they can no longer be considered to be co-linear. If $\Delta\theta < \epsilon_{\theta c}$ operation continues to step S1322. Otherwise, operation jumps directly to step S1324.

In step S1322, a determination is made whether the perpendicular off-set distance $d_{PD}$ is less than the total line position uncertainty. That is, whether the perpendicular offset distance $d_{PD}$ meets the criterion:

$$d_{PD} < (\sigma_1 + \sigma_2).$$

If the perpendicular off-set distance $d_{PD}$ is less than the total line uncertainty $\sigma_1$ and $\sigma_2$, operation continues to step S1323. Otherwise, operation again jumps directly to step S1324.

In step S1323, a determination is made whether the ratio of the endpoint distance over the projected lengths of the two linear features and/or virtual lines is less than a user specific endpoint off-set threshold $E_C$. That is, whether the endpoint offset distance $d_{EP}$ meets the criterion:

$$d_{EP}/(l^P_1 + l^P_2) < E_C.$$

This criterion will always be met if the end point distance is negative, i.e., if the linear features (and/or vertical lines) are overlapping. If so, operation jumps to step S1325. Otherwise, operation continues to step S1324. In step S1324, at least one of the co-linear requirements was not met. Accordingly, operation of the method returns to step S1335. In contrast, in step S11325, all of the co-linearity requirements were met. Accordingly, operation of the method returns to step S1330.

It should be appreciated that, while the steps outline in FIGS. 9 and 10 are shown distinct from each other for ease of understanding and explanation, in a typical implementation of the steps outlined in FIGS. 9 and 10, such as in a programmed microcomputer, microprocessor or the like, steps S1311-S1315 and steps S1321-S1323 would typically be interleaved. For example, step S1321 would be interleaved between steps S1311 and 1312. Similarly, step S1322 would be interleaved between steps S1313 and 1314, while step S1323 would be interleaved between steps S1315 and 1316. In this way, after each set of information sufficient for the next test is determined, it is immediately tested to determine if that co-linearity requirement is met. If not, there is no need to determine the other sets of information and operation can immediately jump to step S1324. In this way, if a pair of linear features and/or virtual lines fails to meet a previous co-linearity requirement, it is not necessary to determine the subsequent co-linearity parameters or perform the further analysis for the subsequent co-linearity requirements.

Figure 11:
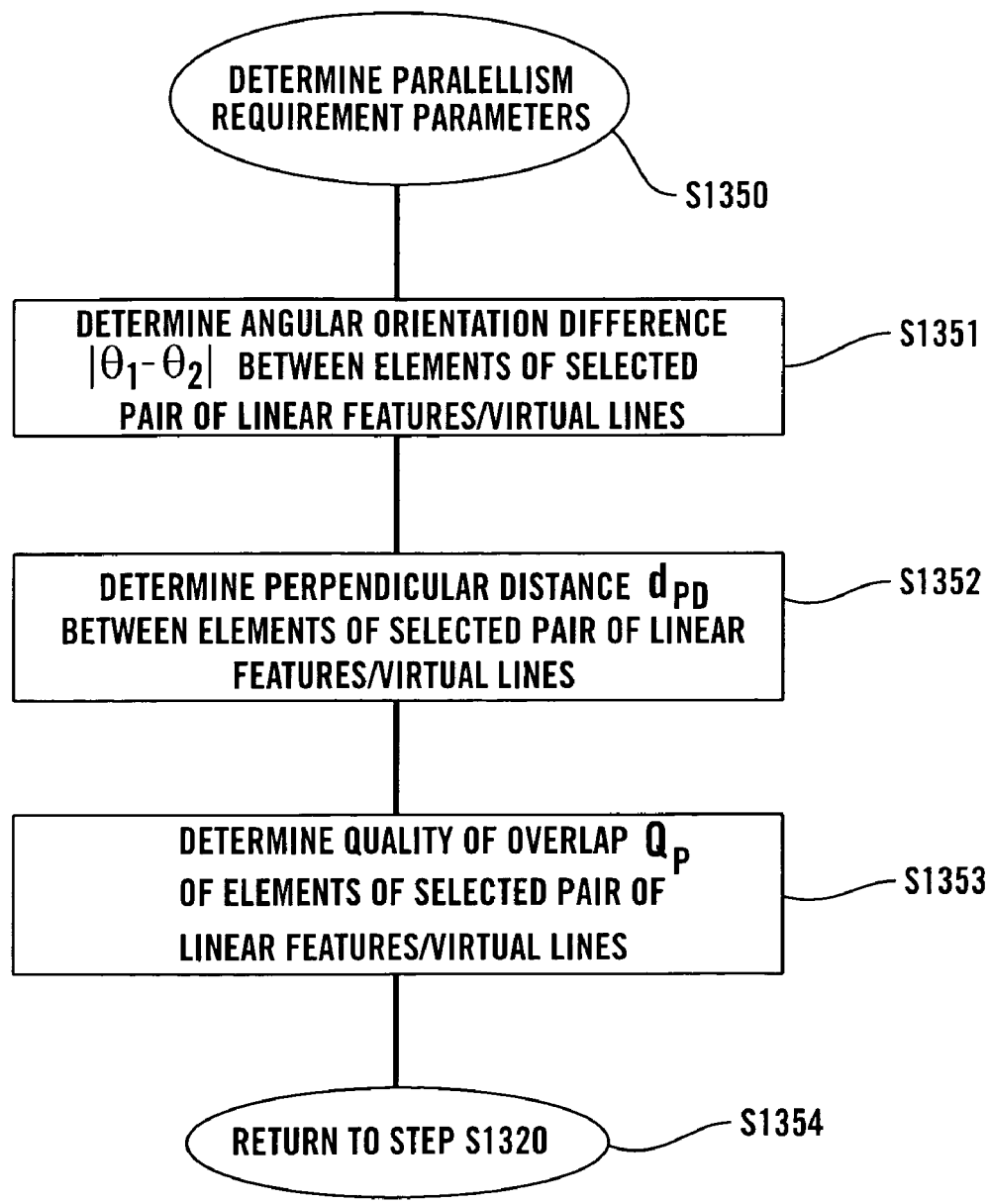
FIG. 11 is a flowchart outlining one exemplary embodiment of a method for determining parallelism requirement parameters for sets of linear features and/or virtual lines.

FIG. 11 outlines one exemplary embodiment of a method for determining the angularity parameters of step S1350. As shown in FIG. 11, beginning in step S1350, operation of the method continues to step S1351, where the angular orientation difference Δθ between the linear features and/or virtual lines of the selected pair of elements is determined. In particular, Δθ is determined as outlined above, except that the input angles θ1 and θ2 represent the orientations of a different set of elements. Next, in step S1352, the determined perpendicular distance $d_{PD}$ between the linear features and/or virtual lines of the selected pair of elements is determined as outlined above. Again, this perpendicular distance $d_{PD}$ is the perpendicular distance for a distinct pair of linear features and/or virtual lines. Then, in step S1353, a quality of overlap measure $Q_P$ for the linear features and/or virtual lines of the selected pair of elements is determined. In particular, in various exemplary embodiments, the quality of the overlap is defined as:

$$Q_P = (l^P_1 + l^P_2)/2l_v,$$

where:

$l^P_1$ and $l^P_2$ are the projected lengths of the pair of selected linear features and/or virtual lines onto a new virtual line, as outlined above with respect to FIG. 6 for that selected pair of virtual lines and/or linear features: and $l_v$ is the length of that new virtual line.

It should be appreciated that this overlap quality measure $Q_P$ is scale independent, as it depends only on the relative lengths of the lines. Overlapping pairs give a $Q_P$ of between 0.5 and 1. In particular, a value of 0.5 represents that the lines overlap only at their endpoints, while a value of 1 represents that the lines perfectly overlap. Operation then continues to step S1354, which returns operation of the method to step S1360.

Figure 12:
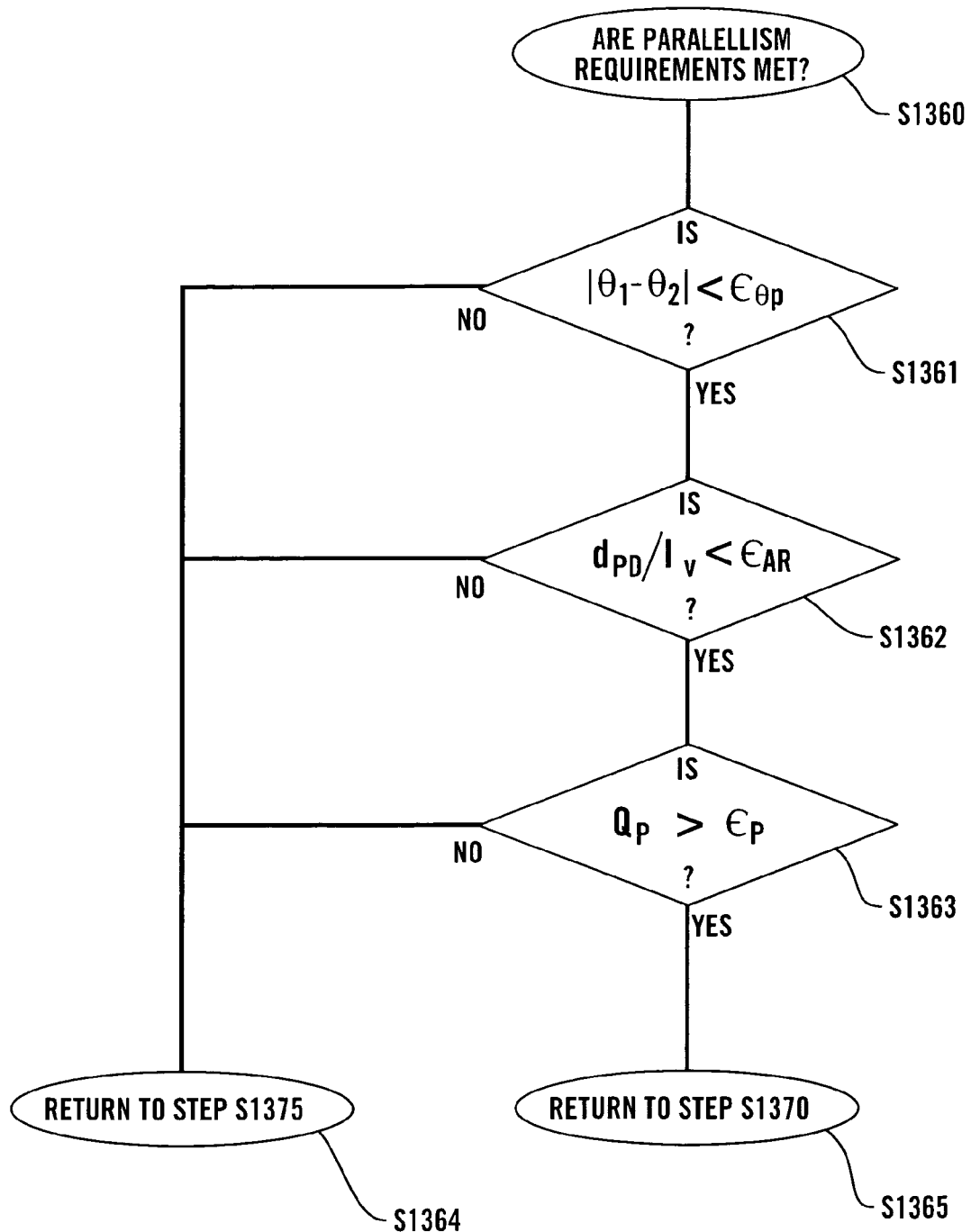
FIG. 12 is a flowchart outlining one exemplary embodiment of a method for determining if the parallelism requirements are met.

FIG. 12 is a flowchart outlining one exemplary embodiment of a method for determining if the parallelism requirements of step S1360 are met. As shown in FIG. 12, operation of the method begins in step S1360, and continues to step S1361, where a determination is made whether the angular orientation difference Δθ meets the criterion:

$$\Delta\theta = |\theta_1 - \theta_2| < \epsilon_{\theta P},$$

where $\epsilon_{\theta P}$ is a user specified threshold. If the absolute value of the angular orientation difference Δθ is less than $\epsilon_{\theta P}$, operation continues to step S1362. Otherwise, operation jumps to step S1364.

In step S1362, a determination is made whether the ratio of the perpendicular off-set distance $d_{PD}$ to the length of the new virtual line $l_v$ is less than a user specified threshold $\epsilon_{AR}$. That is whether the perpendicular off set distance $d_{PD}$ meets the criterion:

$$d_{PD}/L_V < \epsilon_{AR}.$$

If so, operation continues to step S1363. Otherwise, operation again jumps directly to step S1364.

In step S1363, a determination is made whether the overlap quality measure $Q_P$ is greater than the user specified quality threshold $\epsilon_P$. That is whether the overlap quality measure $Q_P$ meets the criterion:

$$Q_P > \epsilon_P.$$

If so, all of the angularity requirements are met and operation jumps to step S1365, which returns control of the method to step S1370. Otherwise, operation continues to step S1364. Step S1364, which is reached when any one or more of the parallelism requirements are not met, returns operation of the method to step S1375.

It should be appreciated that, in various exemplary embodiments according to this invention, to obtain appropriate results, the overlap quality threshold $\epsilon_P$ should be quite high, such as, for example, on the order of 0.86 or higher.

The significance measures of the parallel pairs of elements are used to determine the order in which the parallel pairs are selected for clustering. The significance measure of each pair of elements that meet the linearity requirements is based on the probability that that pair of linear features and/or virtual features will occur. Thus, the significance measure is determined using a probability-based metric suggested in "3-Dimensional Object Recognition from Single Two-Dimensional Images", D. G. Lowe, Artificial Intell., 31(3): 355-395, 1987., which is incorporated herein by reference in its entirety. In particular, the metric suggested by Lowe for the significance S is:

$$S=180° l^2_{min}/(4\Delta\theta d_{pd} l_{max}),$$

where:

$l_{min}$ is the length of the shorter linear feature and/or virtual line in the pair of linear features and/or virtual lines:

$l_{max}$ is the length of the longer one of the pair of linear features and/or virtual lines; and $\Delta\theta$, as outlined above, is a magnitude of the angular difference, in degrees, in the orientations of the two lines.

It should be appreciated that this metric is based on the assumption that the line orientations are uniformly distributed and that the density of line segments of lengths that are greater than a given length l is $1/l^2$. This significance measure gives higher significance to pairs of longer linear features or virtual lines. It should be appreciated, that in general, the significance comes into play only when there is a conflict between two high quality pairs or when two high quality pairs are mutually exclusive. As outlined above, these conflicts arise because the identified parallel pairs can include both virtual lines as well as individual linear features. Thus, if a given linear feature is a member of a high quality parallel pair, but is also one of the constituents of a virtual line that is also a member of another high quality pair, the significance measure will favor the interpretation that leads to the longer object.

Figure 27:
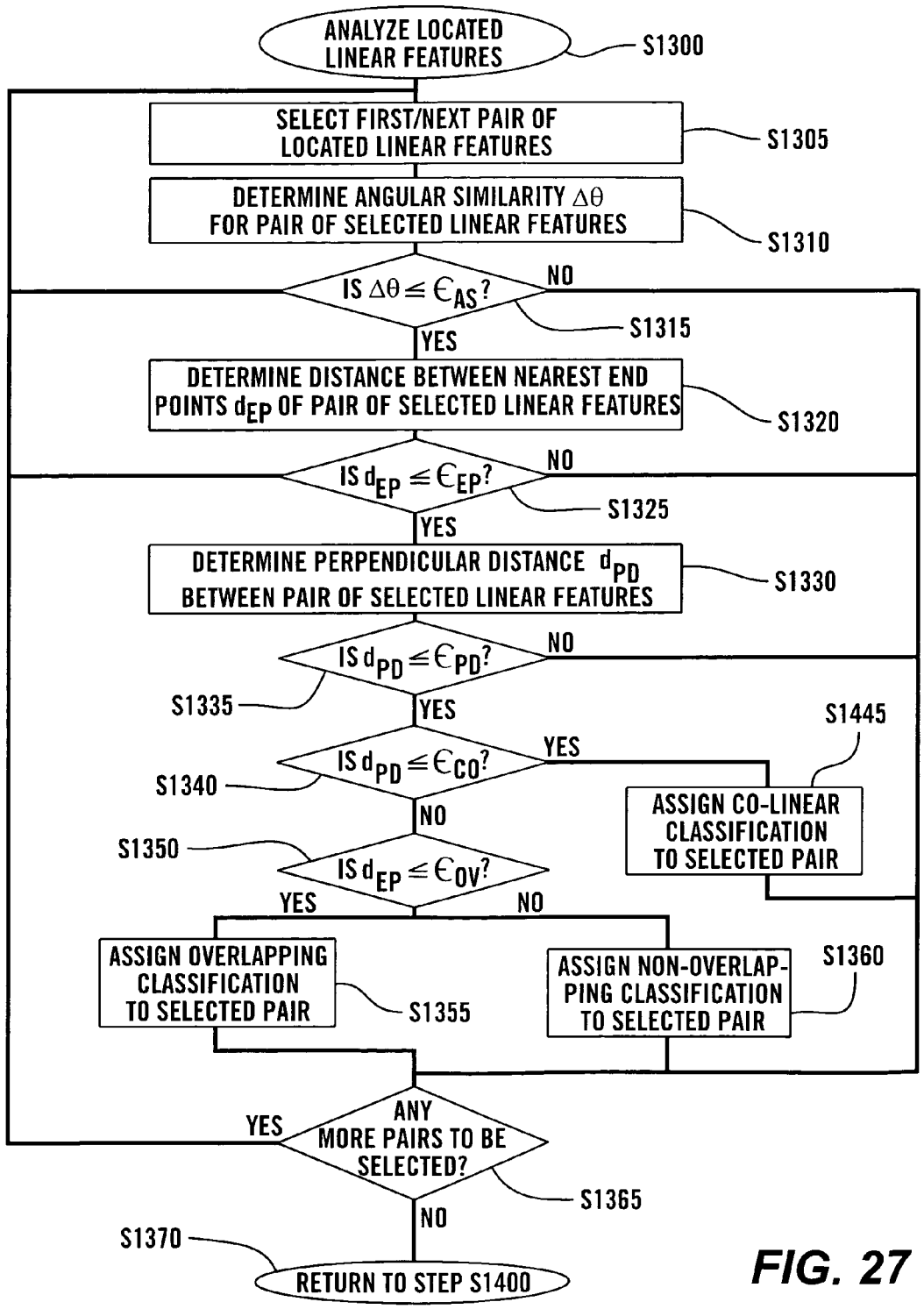
FIG. 27 is a flowchart outlining a second exemplary embodiment of a method for analyzing the located linear features according to this invention.

FIG. 27 is a flowchart outlining a second exemplary embodiment of a method for analyzing located linear features of step S1300 according to this invention. As shown in FIG. 27, in this second exemplary embodiment of the method for analyzing located linear features, operation again begins in step S1300 and continues to step S1305, where a first or next pair of linear features is selected. Then, in step S1310, the angular similarity or angular orientation difference $\Delta\theta$ is determined for the pair of selected linear features. Next, in step S1315, a determination is made whether the angular similarity or angular orientation difference $\Delta\theta$ is less than or equal to a user specified angular similarity threshold $\epsilon_{AS}$. If not, the selected pair of linear features have too large of an angular orientation difference and therefore cannot be co-linear or parallel. Accordingly, operation jumps to step S1365. Otherwise, if the angular similarity or angular orientation difference $\Delta\theta$ is less than the user specified threshold $\epsilon_{AS}$, operation continues to step 1320.

In step S1320, the distance between the nearest end points $d_{EP}$ for the pair of selected linear features is determined, as outlined above with respect to FIG. 6. Next, in step S1320, a determination is made whether the distance between nearest end points $d_{EP}$ is less than the user specified end point offset threshold $\epsilon_{EP}$. If so, operation continues to step S1330. Otherwise, if not, the linear features of the selected pair of linear features are spaced too far apart. Accordingly, operation again jumps to step S1365.

In step S1330, the perpendicular distance $d_{PD}$ between the pair of selected linear features is determined, as outlined above with respect to FIG. 6. Then, in step S1335, a determination is made whether the perpendicular distance $d_{EP}$ is less than or equal to a user specified perpendicular distance threshold $\epsilon_{PD}$. If so, operation continues to step S1340. Otherwise, the linear features of the selected pair of linear features are perpendicularly too far apart and operation again jumps to step S1365.

In step S1340, a determination is made whether the perpendicular distance $d_{PD}$ is less than or equal to a co-linear perpendicular distance threshold $\epsilon_{CO}$. If so, the linear features of the selected pair of linear features are co-linear and operation jumps to step S1445, where the co-linear classification is assigned to the selected pair. Operation then again jumps to step S1365. If not, the linear features of the selected pair of linear features are not collinear but may be overlapping. Accordingly, operation continues to step S1350, where a determination is made whether the determined distance between nearest end points $d_{EP}$ is less than or equal to a user specified overlapping distance $\epsilon_{OV}$. If so, operation continues to step S1355, where the selected pair of linear features is assigned the overlapping classification. Operation then jumps to step S1365. If not, operation jumps to step S1360, where the selected pair of linear features is assigned the non-overlapping classification. Operation then continues to step S1365, where a determination is made whether there are any more pairs of linear features to be selected. If so, operation jumps back to step S1305. Otherwise, operation continues to step S1370, where operation of the method returns to step S1400.

Figure 29:
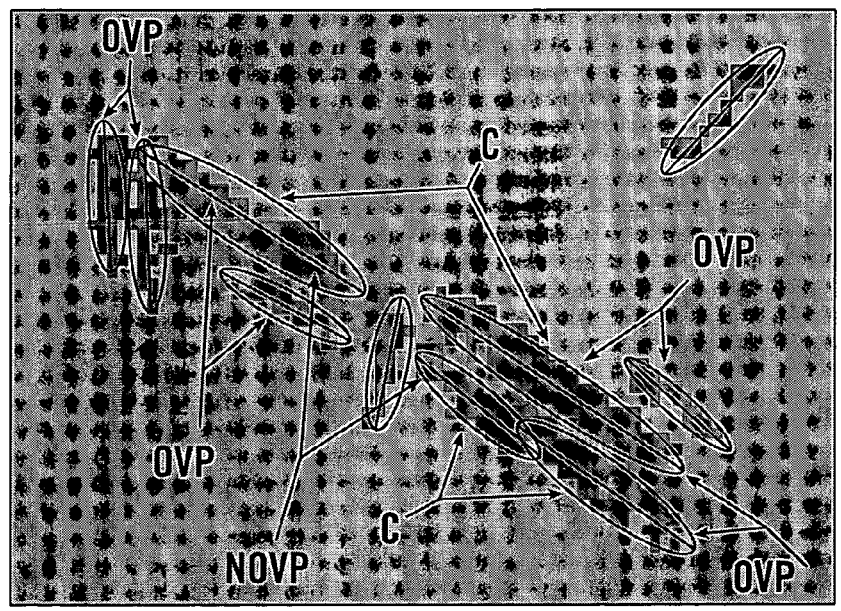
FIG. 29 illustrates pair wise relationships between the linear features of another set of connected components developed from the image shown in FIG. 15.

FIG. 29 shows another set of line support regions extracted from the image shown in FIG. 13, as outlined above with respect to FIGS. 5 and 16. In the exemplary image shown in FIG. 29, the connected component line support regions and the major axes are also shown, as outlined above with respect to FIGS. 5, 17 and 18. In FIG. 29, some of the various classifications, as outlined above with respect to FIG. 27, are shown relative to various pairs of the linear features. In particular, FIG. 29 illustrates various co-linear pairs, including pairs that are spaced apart and pairs that are partially overlapping. FIG. 29 also illustrates various relationships that are classified as overlapping and relationships that are classified as non-overlapping.

Figure 28:
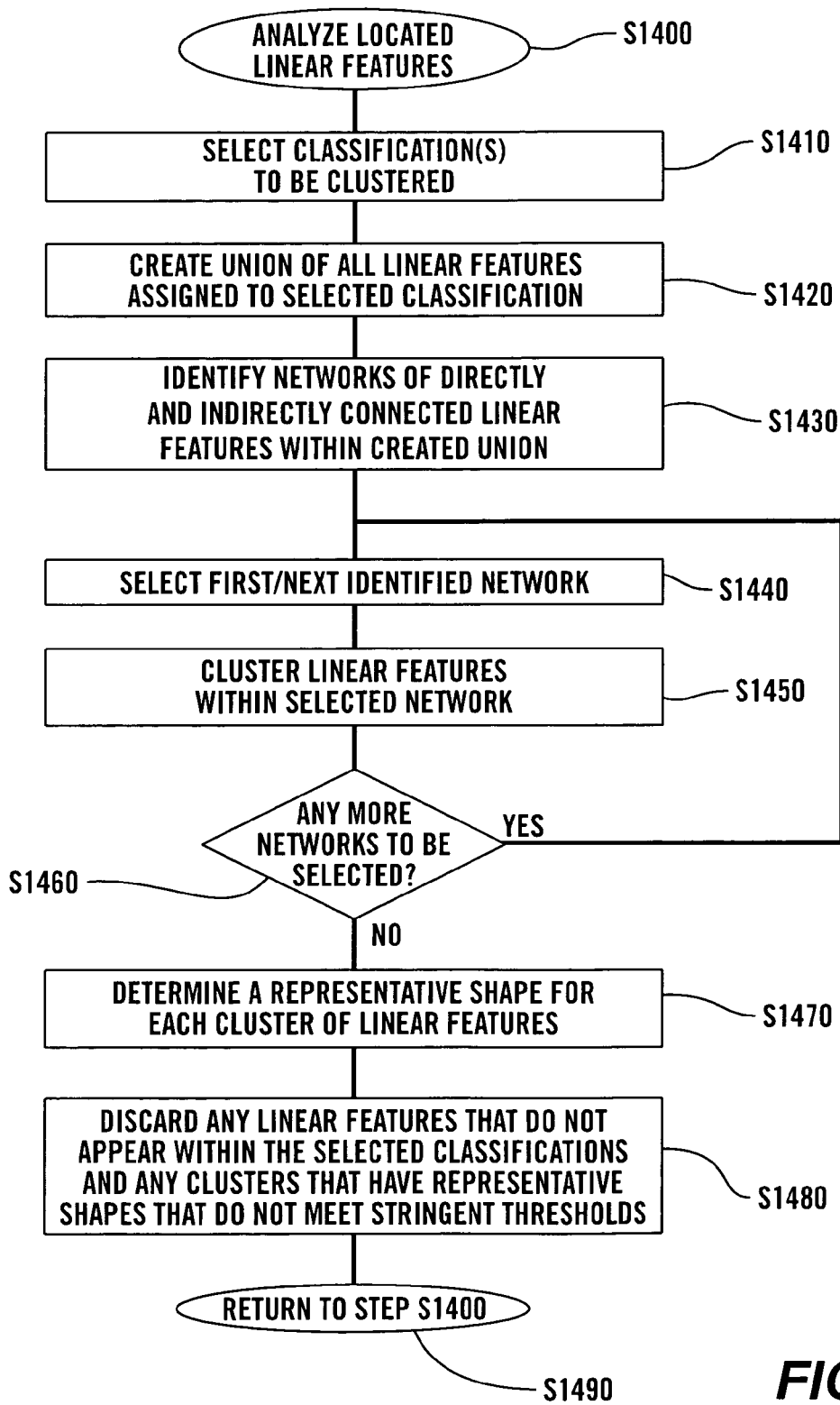
FIG. 28 is a flowchart outlining a second exemplary embodiment of a method for clustering the located linear features according to this invention.

FIG. 28 is a flowchart illustrating a second exemplary embodiment of a method for clustering sets of located linear features of step S1400 according to this invention. As shown in FIG. 28, in the second exemplary embodiment of the method of clustering sets of located linear features, operation begins in step S1400 and continues to step S1410, where one or more of the various different types of classifications, such as, for example, co-linear, overlapping or non-overlapping, are selected for clustering. Typically, in various exemplary embodiments of systems and methods according to this invention, the co-linear and overlapping classification types are selected for clustering, while the non-overlapping classification is not.

Figure 30:
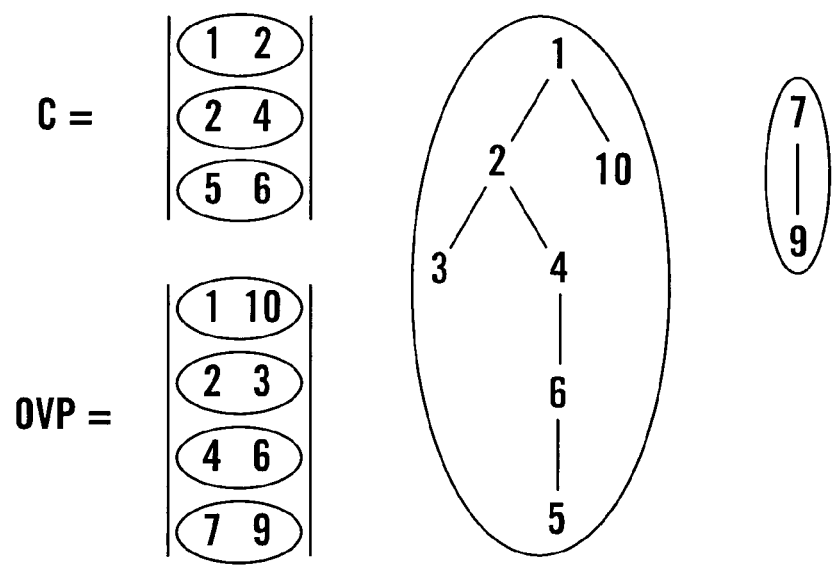
FIG. 30 illustrates one exemplary network of overlapping parallel and co-linear linear features.

Then, in step S1420, for each classification, a union of all pairs that have been assigned that classification is created. Thus, when the co-linear and overlapping classification are selected, unions like those shown in FIG. 30 are created. As shown in FIG. 30, various linear features may be involved in one or more linear pairs and may be involved in one or more overlapping pairs. Thus, each linear feature may appear zero, once or more than once in each of the unions of the different classifications.

Next, in step S1430, networks of directly and indirectly connected linear features within the created unions are identified. For example, given the unions shown in FIG. 30, the two networks shown in FIG. 30 can be generated. As shown in FIG. 30, the co-linear pairs 1, 2 and 2, 4 form an initial network. The overlapping linear feature pairs 1 and 10, 2 and 3 and 4 and 6 can be added to that network, because at least one linear feature of each of those pairs already appears in the network begun by analyzing the union of the co-linear pairs. Additionally, because the linear feature 6 now appears in the network, the co-linear pair 5, 6, which could not previously be added to the network, can be added to the network. This continues until no further co-linear or overlapping pairs can be added to the network in view of the previous additions to the network. Once that network has completed, another network can be begun, such as the network 7, 9 shown in FIG. 30. Operation then continues to step S1440.

Figure 31:
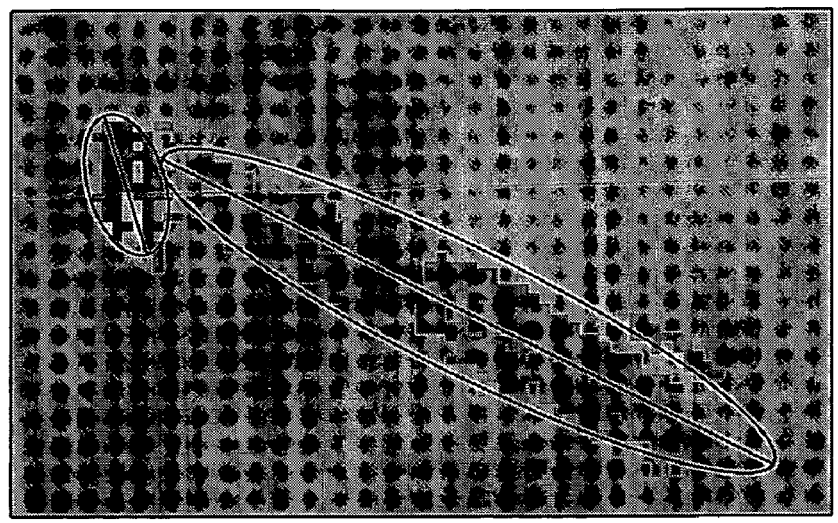
FIG. 31 shows the representative lines and combined connected components identified after clustering and grouping the linear features shown in FIG. 29.

In step S1440, a first or next one of the identified networks is selected. Then, in step S1450, the linear features, or more particularly, the line support regions underlying those linear features, within the selected network are clustered to form a single line support region, as shown in FIG. 31. Next, in step S1460, a determination is made whether there are any more networks identified in step S1430 that need to be selected. If so, operation returns to step S1430. Otherwise, operation continues to step S1470.

Figure 32:
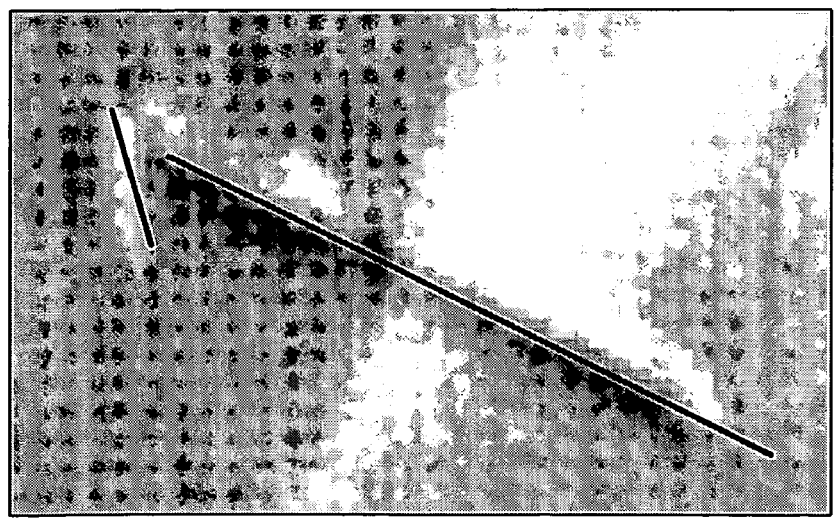
FIG. 32 shows the image shown in FIG. 15 with the linear features shown in FIG. 31 superimposed on it.
Figure 33:
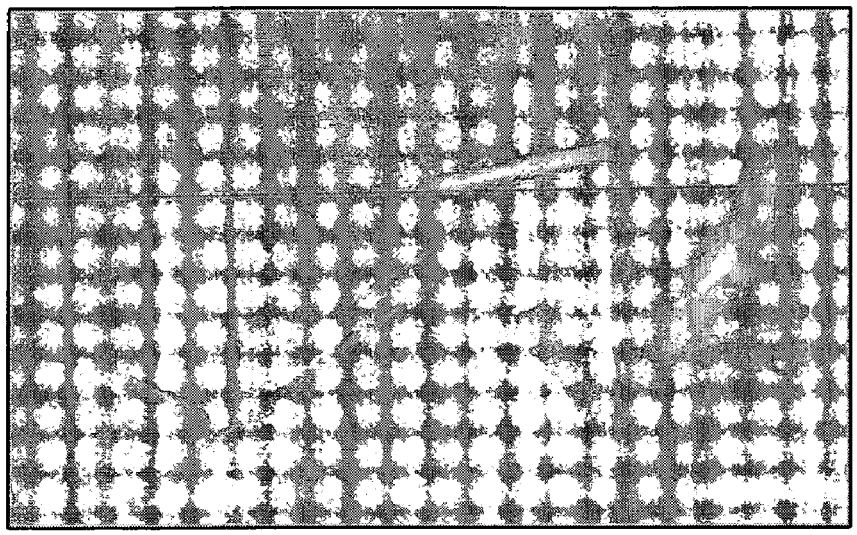
FIG. 33 shows a second image obtained by in situ sampling a suspension crystallization process.

In step S1470, a representative shape is determined for each cluster of linear features, or more particularly, the combined line support regions underlying those clustered linear features. Thus, as shown in FIG. 31, a representative best-fit ellipse can be determined for the clustered line support regions shown in FIG. 31. As outlined above, while various exemplary embodiments use the blob analysis technique, it should be appreciated that other shape determining techniques can be used. It should be further appreciated that, as outlined above, once the best fit ellipse is determined, a major axis can be determined for that best fit ellipse, as well as a minor axis, a centroid and an orientation. Next, in step S1480, any linear features that do not appear within the selected classifications and that do not meet one or more user defined thresholds for major axis length, aspect ratio, i.e., the ratio between the length of the major axis and the length of the minor axis, as outlined above, or the like, are discarded. The remaining lines for the representative shapes represent the determined object lengths, centers and orientations. FIG. 32 shows the representative lines, i.e., the major axes of the determined best-fit ellipses, superimposed on the image shown on FIG. 15. Operation then continues to step S1490, where operation returns to step S1500.

Figure 34:
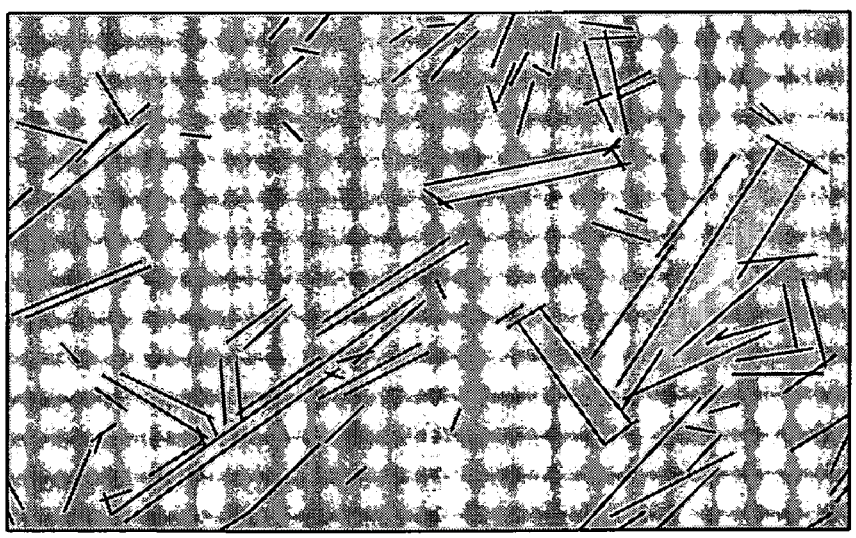
FIG. 34 shows the image shown in FIG. 33 with linear features determined by analyzing the image shown in FIG. 33 using systems and methods according to this invention.
Figure 35:
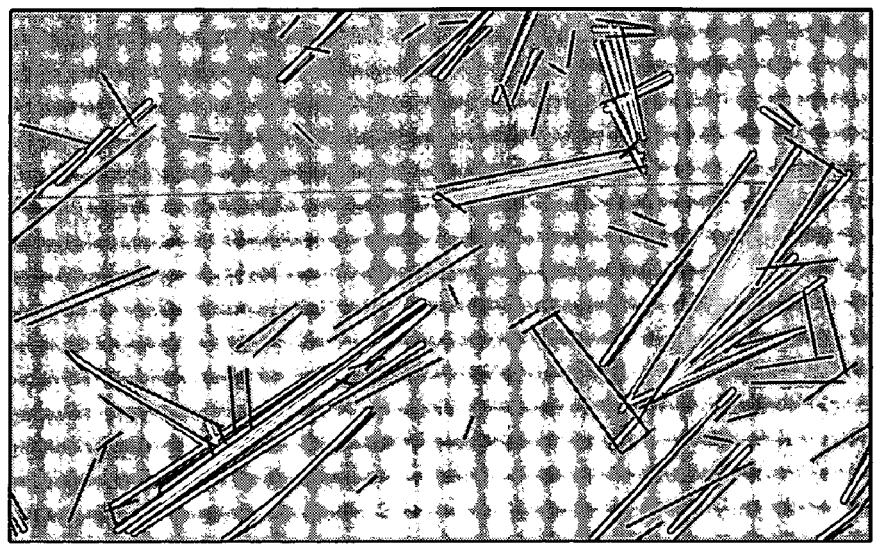
FIG. 35 shows the image of FIG. 34 after analyzing the linear features to determine co-linear linear features and determine associated virtual lines, according to the first embodiment of systems and methods according to this invention, with the identified virtual lines superimposed on the image of FIG. 34.
Figure 36:
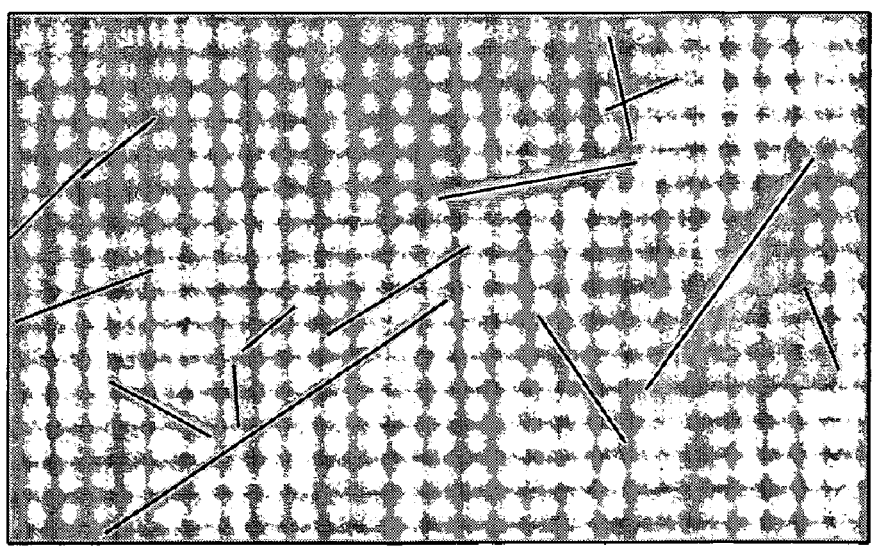
FIG. 36 shows the image of FIG. 33 with the determined object representative lines superimposed on the objects located in the image.

FIGS. 33-36 illustrate another sample image analyzed using the methods outlined above with respect to FIGS. 4, 5 and 7-12. Beginning with the raw image in FIG. 33, a plurality of linear features are determined from that image data. FIG. 34 shows the determined linear features superimposed on the image shown in FIG. 33. Next, as shown in FIG. 35, a plurality of virtual lines representing co-linear pairs of co-linear linear features are determined. FIG. 35 shows these virtual lines superimposed over the linear features of FIG. 34, which are in turn superimposed on the image shown in FIG. 33. The virtual lines and linear features are then analyzed to identify pairs of the linear features and/or virtual lines that meet the parallelism requirements outlined above. These parallel pairs of linear features and/or virtual lines are then clustered as outlined above. In particular, the line support regions for these various linear features are clustered to form a combined line support region. A best-fit ellipse is then fit to that combined line support region and a major axis for that best fit ellipse is determined. FIG. 36 shows the major axes of the identified clusters superimposed over the image data shown in FIG. 33.

While this invention has been described in conjunction with the exemplary embodiments outlined above, various alternatives, modifications, variations, improvements and/or substantial equivalents, whether known or that are or may be presently foreseen, may become apparent to those having at least ordinary skill in the art. Accordingly, the exemplary embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The invention claimed is:

1. A method for locating objects in an image containing at least one object to be located, comprising:
    obtaining an image comprising a plurality of pixels having image values;
    segmenting the plurality of pixels of the obtained image into a plurality of connected pixel components, each connected pixel component comprising a subset of the plurality of pixels;
    locating, for each of at least some of the connected pixel components, at least one linear feature, each located linear feature representative of at least one spatial parameter of that connected pixel component;
    analyzing the located linear features at least to identify pairs of located linear features that are co-linear;
    analyzing a set of linear elements to identify pairs of spatially-related linear elements, the set of linear elements comprising at least the linear features of at least one identified pair of co-linear located linear features;
    identifying subsets of spatially-related located linear features based on the identified pairs of spatially-related linear elements, each identified subset comprising at least two spatially-related located linear features;
    generating, for each identified subset of spatially-related located linear features, a combined connected pixel component from the connected pixel components represented by the spatially-related located linear features of that identified subset; and
    determining, for each combined connected pixel component, at least one linear feature for that combined connected pixel component, wherein the at least one linear feature for that combined connected pixel component is representative of one of the objects to be located in the image.

2. The method of claim 1, wherein:
    segmenting the plurality of pixels of the obtained image into a plurality of connected pixel components comprises:
        determining, for each pixel, a gradient direction for the image value of that pixel;
        applying at least one gradient direction quantization map to the determined gradient directions for the plurality of pixels to generate at least one quantized gradient direction for each of the plurality of pixels; and
        determining, for each applied gradient quantization map, at least one connected pixel component within the plurality of pixels, based on the quantized gradient directions for the plurality of pixels associated with that applied gradient quantization map; and
    locating, for each of at least some of the connected pixel components, at least one located linear feature occurring within the image comprises determining, for each of at least some of the determined connected pixel components, at least one linear feature for that connected pixel component.

3. The method of claim 2, further comprising, if a plurality of gradient quantization maps are applied to the determined gradient directions for the plurality of pixels, determining, for any connected components for different gradient quantization maps that contain at least one pixel in common, one of those connected components to be used when determining the at least one linear feature.

4. The method of claim 2, wherein analyzing the located linear features at least to identify pairs of located linear features that are co-linear comprises:
selecting a pair of elements from an initial set of elements comprising at least the determined linear features;
determining at least one co-linearity parameter for the selected pair of elements;
comparing, for at least one co-linearity requirement, at least one corresponding co-linearity parameter with that co-linearity requirement; and
if a determined number of the at least one co-linearity requirement are met, adding a virtual line determined based on at least the selected pair of elements to a set of elements comprising at least the virtual lines.

5. The method of claim 4, further comprising repeating the selecting, determining, comparing, and adding steps for at least one other pair of elements selected from the set of elements.

6. The method of claim 5, wherein repeating the selecting, determining, comparing, and adding steps for at least one other pair of elements selected from the set of elements comprising repeating the selecting, determining, comparing, and adding steps for each other pair of elements selected from the set of elements.

7. The method of claim 4, wherein adding the determined virtual line to a set of elements comprising at least the virtual lines comprises adding the determined virtual line to the initial set of elements that comprises at least the determined linear features.

8. The method of claim 4, wherein:
the set of co-linear elements comprises at least some of the determined linear features and at least one virtual line, each virtual line corresponding to an identified pair of co-linear located linear features; and
analyzing the set of co-linear elements, to identify pairs of spatially-related elements, comprises:
selecting a pair of elements from the set of co-linear elements;
determining if the selected pair is a valid pair;
determining, if the selected pair is a valid pair, at least one parallelism parameter for the selected pair of elements;
comparing, for each of at least one parallelism requirement, at least one corresponding determined parallelism parameter for the selected pair of elements with that parallelism requirement; and
if a determined number of the at least one parallelism requirement for the selected pair of elements are met:
determining a significance value for the selected pair of elements, and
adding the selected pair of elements, along with the determined significance value, to a set of spatially-related element pairs that met the determined number of the at least one parallelism requirement.

9. The method of claim 8, wherein identifying subsets of at least two spatially-related located linear features comprises:
selecting, from the set of spatially-related element pairs that met the determined number of the at least one parallelism requirement, a pair of spatially-related elements in the set having a greatest significance value;
determining, if the selected pair of spatially-related elements includes at least one virtual line, the linear features associated with that linear line;
selecting, from the set of spatially-related element pairs that met the determined number of the at least one parallelism requirement, any other pairs of spatially-related elements that include at least one spatially-related element of the pair of selected spatially-related elements having the greatest significance value and any pairs of spatially-related elements that include at least one of the determined linear features associated with at least one spatially-related element of the pair of selected elements having the greatest significance value;
determining, if any of the newly selected pairs of spatially-related elements includes at least one virtual line, the linear features associated with that virtual line; and
identifying the subset of at least two spatially-related located linear features from the linear features in the selected pairs of spatially-related elements and the linear features determined to be associated with any selected virtual lines.

10. The method of claim 1, further comprising determining at least one parameter for the combined connected pixel components.

11. The method of claim 10, further comprising:
generating at least one control signal based on the at least one determined parameter;
outputting at least one of the at least one generated control signals to at least one controllable device; and
for each at least one controllable device to which at least one generated control signal is output, controlling at least one function of that controllable device based on the at least one control signal output to that controllable device.

12. The method of claim 11, wherein the at least one controllable device is at least one of a controllable actuator, a controllable signaling device and a programmed computing device programmed to perform at least one function in response to the at least one control signal.

13. The method of claim 10, further comprising:
generating at least one data signal based on the at least one determined parameter;
outputting the at least one generated data signal to at least one device; and
for each at least one device to which at least one generated data signal is output, performing at least one function of that device based on the at least one data signal output to that device.

14. The method of claim 13, wherein the at least one device is at least one of a controllable actuator, a signaling device, a control signal generating device that generates at least one control signal based on the at least one data signal and a programmed computing device programmed to perform at least one function in response to the at least one data signal.

15. The method of claim 10, further comprising
determining at least one statistical measure based on the at least one determined parameter;
generating at least one control signal based on the at least one determined statistical measure;
outputting at least one of the at least one generated control signals signal to at least one controllable device; and
for each at least one controllable device to which at least one generated control signal is output, controlling at least one function of that controllable device based on the at least one control signal output to that controllable device.

16. The method of claim 15, wherein the at least one controllable device is at least one of a controllable actuator, a controllable signaling device and a programmed computing device programmed to perform at least one function in response to the at least one control signal.

17. The method of claim 10, further comprising:
   determining at least one statistical measure based on the at least one determined parameter;
   generating at least one data signal based on the at least one statistical measure;
   outputting the at least one generated data signal to at least one device; and
   for each at least one device to which at least one generated data signal is output, performing at least one function of that device based on the at least one data signal output to that device.

18. The method of claim 17, wherein the at least one device is at least one of a controllable actuator, a signaling device, a control signal generating device that generates at least one control signal based on the at least one data signal and a programmed computing device programmed to perform at least one function in response to the at least one data signal.

19. The method of claim 10, further comprising
   determining at least one statistical measure based on the at least one determined parameter;
   outputting at least one of at least one control signal and at least one information signal, based on at least one of the at least one determined parameter and the at least one determined statistical measure, to at least one device; and
   for each at least one device to which at least one generated control or information signal is output, controlling at least one function of that device based on the at least one control or information signal output to that device.

20. The method of claim 19, wherein the at least one device is at least one of a controllable actuator, a signaling device, a control signal generating device that generates at least one control signal based on the at least one control or information signal and a programmed computing device programmed to perform at least one function in response to the at least one control or information signal.

21. The method of claim 1, further comprising repeating the selecting, determining, comparing, and adding steps for at least one other pair of elements selected from the initial set of elements.

22. The method of claim 21, wherein repeating the selecting, determining, comparing, and adding steps for at least one other pair of elements selected from the initial set of elements comprising repeating the selecting, determining, comparing, and adding steps for each other pair of elements selected from the initial set of elements.

23. The method of claim 1, wherein adding the determined virtual line to a set of elements comprising at least the virtual lines comprises adding the determined virtual line to the initial set of elements that comprises at least the located linear features.

24. The method of claim 1, wherein:
   the set of co-linear elements comprises at least some of the located linear features and at least one added virtual line; and
   analyzing the set of co-linear elements, to identify pairs of spatially-related elements comprises:
      selecting a pair of elements from the set of co-linear elements;
      determining if the selected pair is a valid pair;
      determining if the selected pair is a valid pair, at least one parallelism parameter for the selected pair of elements;
      comparing, for each of at least one parallelism requirement, at least one corresponding determined parallelism parameter for the selected pair of elements with that parallelism requirement; and
      if a determined number of the at least one parallelism requirement for the selected pair of elements are met:
         determining a significance value for the selected pair of elements, and
         adding the selected pair of elements, along with the determined significance value, to a set of spatially-related element pairs that met the determined number of the at least one parallelism requirement.

25. The method of claim 24, wherein identifying subsets of at least two spatially-related located linear features comprises:
   selecting, from the set of spatially-related element pairs that met the determined number of the at least one parallelism requirement, a pair of spatially-related elements in the set having the greatest significance value;
   determining, if the selected pair of spatially-related elements includes at least one virtual line, the linear features associated with that virtual line;
   selecting, from the set of spatially-related element pairs that met the determined number of the at least one parallelism requirement, any other pairs of spatially-related elements that include at least one spatially-related element of the pair of selected spatially-related elements having the greatest significance value and any pairs of spatially-related elements that include at least one of the determined linear features associated with at least one spatially-related element of the pair of selected elements having the greatest significance value;
   determining, if any of the newly selected pair of spatially-related elements includes at least one virtual line, the linear features associated with that virtual line; and
   identifying the subset of at least two spatially-related located linear features from the linear features in the selected pairs of spatially-related elements and the linear features determined to be associated with any selected virtual lines.

26. A method for locating occurrences of at least one known object in an image, each known object having linear features having at least one known spatial relationship, the image containing at least one occurrence of the known object to be located, the method comprising:
   obtaining an image comprising a plurality of pixels having image values, the image containing occurrences of at least one known object;
   segmenting the plurality of pixels of the obtained image into a plurality of connected pixel components, each connected pixel component comprising a subset of the plurality of pixels;
   determining, for at least some of the connected components, a linear feature representative of that connected pixel component;
   analyzing the determined linear features;
   clustering subsets of the linear features based on the analysis of the linear features;
   combining, for each subset of linear components, the connected pixel components associated with that subset of linear components into a combined pixel component; and
   determining, for each combined pixel component, at least one linear feature corresponding to that combined pixel connected component, wherein the at least one linear feature corresponding to that combined connected component corresponds to an occurrence of one of the at least one known object in the image.

27. The method of claim 1, wherein the recited steps are carried out in a logic circuit programmed to locate objects in the obtained image.

28. The method of claim 1, wherein generating a combined connected pixel component includes transforming the connected pixel components represented by the spatially-related located linear features of that identified subset into the combined connected pixel component.

29. The method of claim 26, wherein the recited steps are carried out in a logic circuit programmed to locate occurrences of at least one known object in the obtained image.

30. A system for locating objects in an image containing at least one object to be located, the image being represented by image data including a plurality of pixels having image values, the system comprising:

a logic circuit configured to segment the plurality of pixels of the obtained image data into a plurality of connected pixel components, each connected pixel component comprising a subset of the plurality of pixels;

locate, for each of at least some of the connected pixel components, at least one linear feature represented by the connected pixel components, each located linear feature representative of at least one spatial parameter of that connected pixel component;

analyze the located linear features to identify pairs of located linear features that are co-linear;

analyze a set of linear elements to identify pairs of spatially-related linear elements, the set of linear elements comprising at least the linear features of at least one identified pair of co-linear located linear features;

identify subsets of spatially-related located linear features based on the identified pairs of spatially-related linear elements, each identified subset comprising at least two spatially-related located linear features;

generate, for each identified subset of spatially-related located linear features, a combined connected pixel component from the connected pixel components represented by the spatially-related located linear features of that identified subset; and determine, for each combined connected pixel component, at least one linear feature for that combined connected pixel component, the at least one linear feature for that combined connected pixel component being representative of one of the objects to be located in the image.

* * * * *

UNITED STATES PATENT AND TRADEMARK OFFICE
CERTIFICATE OF CORRECTION

PATENT NO. : 7,885,467 B2
APPLICATION NO. : 11/237088
DATED : February 8, 2011
INVENTOR(S) : Larsen et al.

It is certified that error appears in the above-identified patent and that said Letters Patent is hereby corrected as shown below:

In the Specification

Col. 6, line 2: "represents" should read --representations--.

Col. 10, line 64: "signal" should read --signals--.

Col. 12, line 67: "low quality of a plurality" should read --low quality image of a plurality--.

Col. 15, line 4: "becomes" should read --become--.

Col. 18, line 22: "or:" should read --or--.

Col. 19, line 14: "parameters for selected" should read --parameters for the selected--.

Col. 21, line 8: "In particular, lines 18 and 21" should read --In particular, virtual lines 18 and 21--.

Col. 23, line 37: "S11325" should read --S1325--.

Col. 23, line 39: "outline" should read --outlined--.

Signed and Sealed this
Twenty-sixth Day of April, 2011

David J. Kappos
*Director of the United States Patent and Trademark Office*